United States Patent
Oishi et al.

(10) Patent No.: US 7,766,776 B2
(45) Date of Patent: Aug. 3, 2010

(54) V-SHAPED BELT, BELT-TYPE TRANSMISSION, AND SADDLE TYPE-VEHICLE

(75) Inventors: Akifumi Oishi, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 816 days.

(21) Appl. No.: 11/196,496

(22) Filed: Aug. 2, 2005

(65) Prior Publication Data

US 2006/0030443 A1 Feb. 9, 2006

(30) Foreign Application Priority Data

Aug. 6, 2004 (JP) .............................. 2004-231035
Jun. 24, 2005 (JP) .............................. 2005-184747

(51) Int. Cl.
*F16G 1/21* (2006.01)

(52) U.S. Cl. ....................... 474/242; 474/240

(58) Field of Classification Search ................. 474/242, 474/201, 244, 240
See application file for complete search history.

(56) References Cited

U.S. PATENT DOCUMENTS

| 4,338,081 | A | * | 7/1982 | Hattori et al. ................ 474/201 |
| 4,433,965 | A | * | 2/1984 | Hattori et al. ................ 474/201 |
| 4,552,549 | A | * | 11/1985 | Hattori ........................ 474/202 |
| 4,655,732 | A | | 4/1987 | Takashima |
| 4,718,881 | A | * | 1/1988 | Sugimoto et al. ............. 474/242 |
| 4,894,048 | A | * | 1/1990 | Inukai et al. ................. 474/240 |
| 6,306,055 | B1 | * | 10/2001 | Serkh .......................... 474/242 |
| 6,530,854 | B2 | * | 3/2003 | Sakuma et al. ............... 474/237 |
| 2001/0041636 | A1 | * | 11/2001 | Serkh et al. .................. 474/242 |
| 2003/0092523 | A1 | * | 5/2003 | Sakanaka et al. ............. 474/242 |

FOREIGN PATENT DOCUMENTS

| DE | 10026876 | 12/2001 |
| EP | 0257646 | 3/1988 |
| EP | 1106865 | 6/2001 |
| EP | 1258652 | 11/2002 |
| JP | 61-286638 | 12/1986 |
| JP | 2001-159453 | 6/2001 |
| JP | 2002-147553 | 5/2002 |
| JP | 2003-074642 | 3/2003 |
| JP | 2004-003531 | 1/2004 |
| JP | 2005273725 A | * 10/2005 |

* cited by examiner

*Primary Examiner*—Robert A Siconolfi
*Assistant Examiner*—Anna Momper
(74) *Attorney, Agent, or Firm*—Keating & Bennett, LLP

(57) ABSTRACT

To enhance the durability of the V-shaped belt by allowing the strength and the heat-radiating property of the resin blocks to stand together at high levels in the V-shaped belt, which has a plurality of resin blocks and endless connecting members connecting the resin blocks. The V-shaped belt includes a plurality of resin blocks arranged in a direction and an endless connecting member that is impacted into the resin blocks and that extends in the arrangement direction of the resin blocks. Depressions are longitudinally and vertically formed in the upside and downside of the front surface and the rear surface of each resin block. The depressions are separated from the connecting member and are also separated from the lateral surfaces of the resin block.

13 Claims, 23 Drawing Sheets

[Fig. 1]
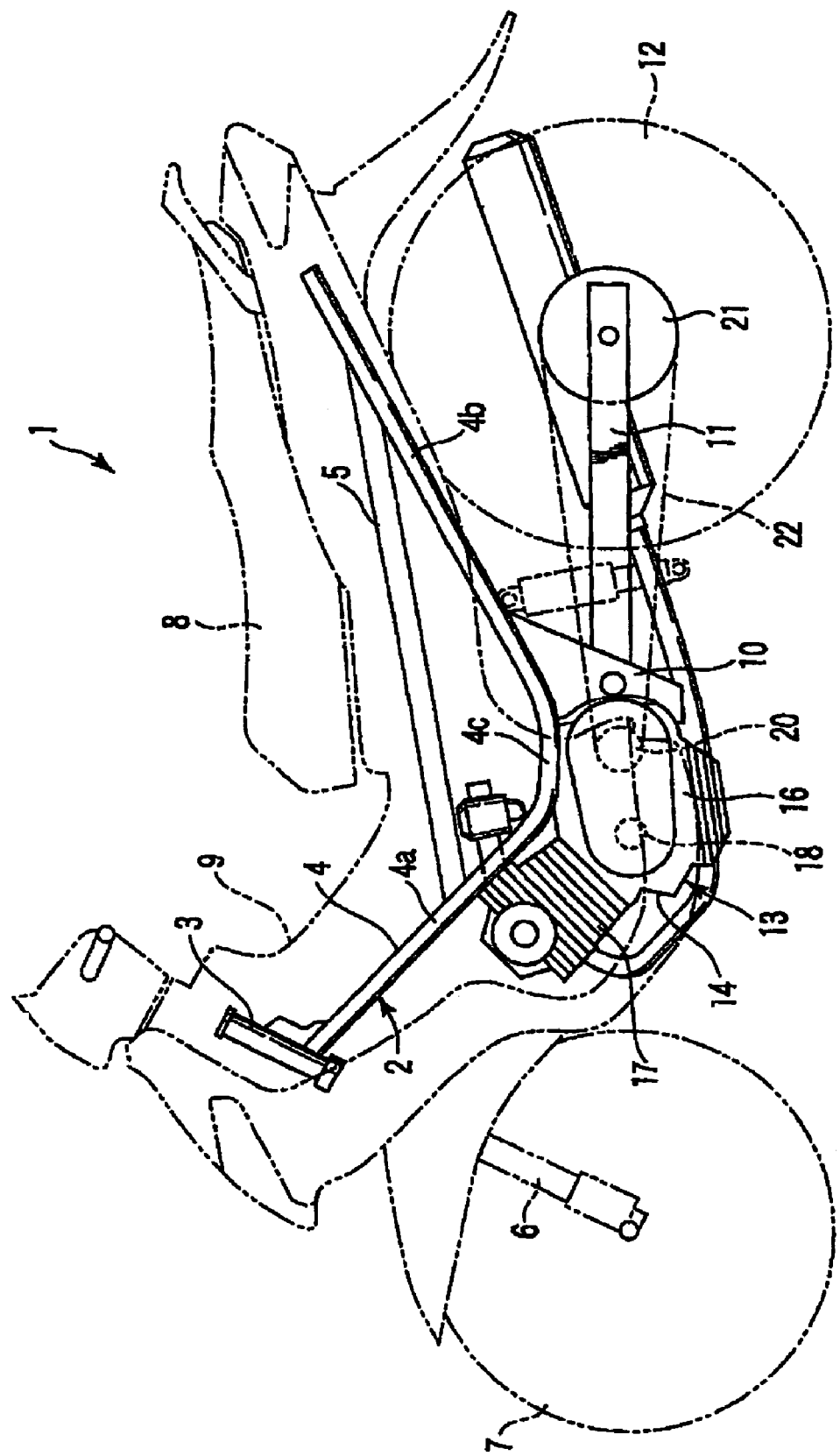

[Fig. 2]
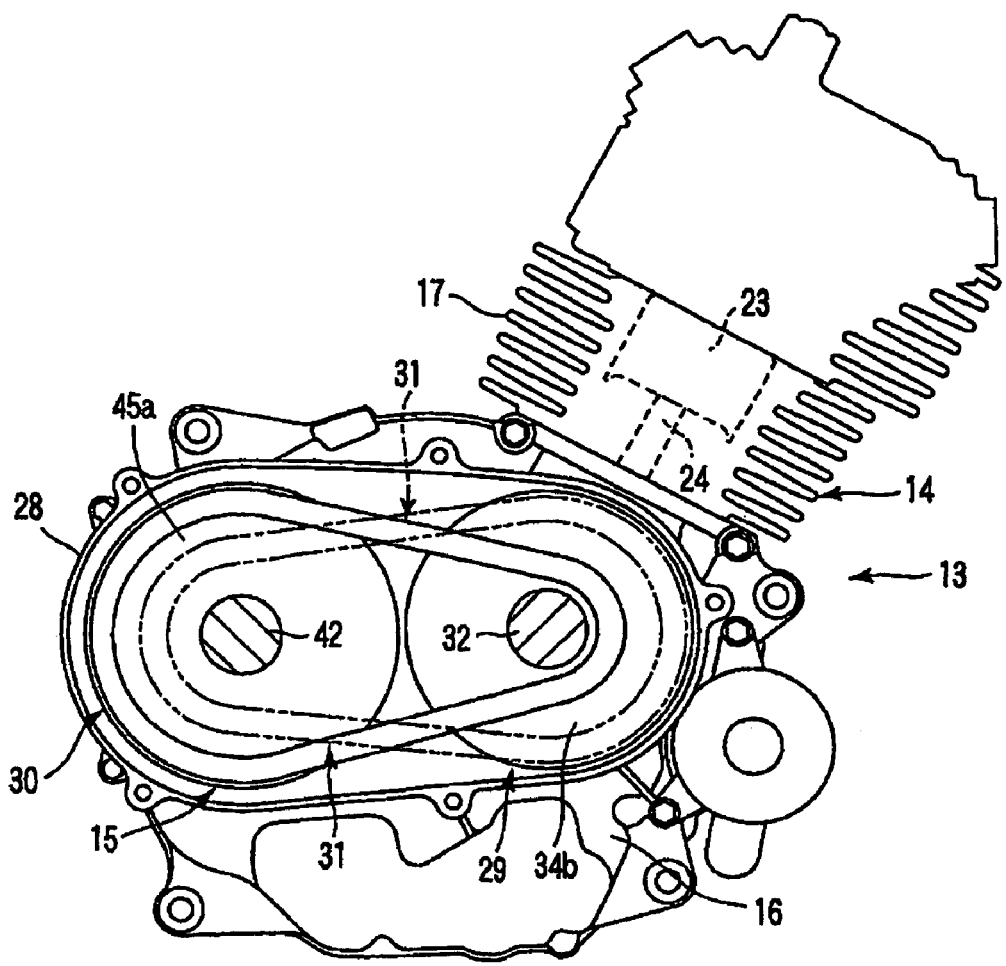

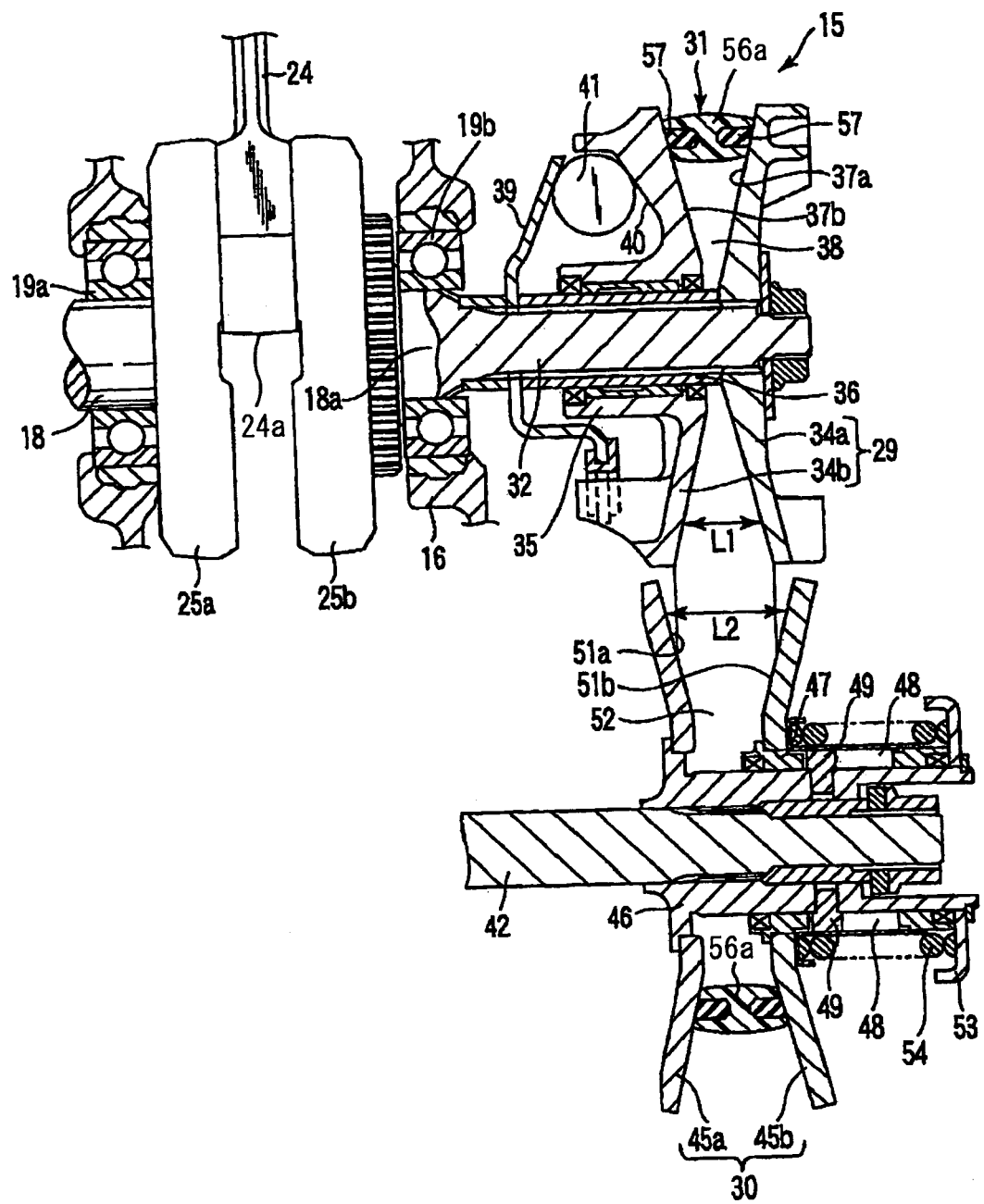
[Fig. 3]

[Fig. 4]
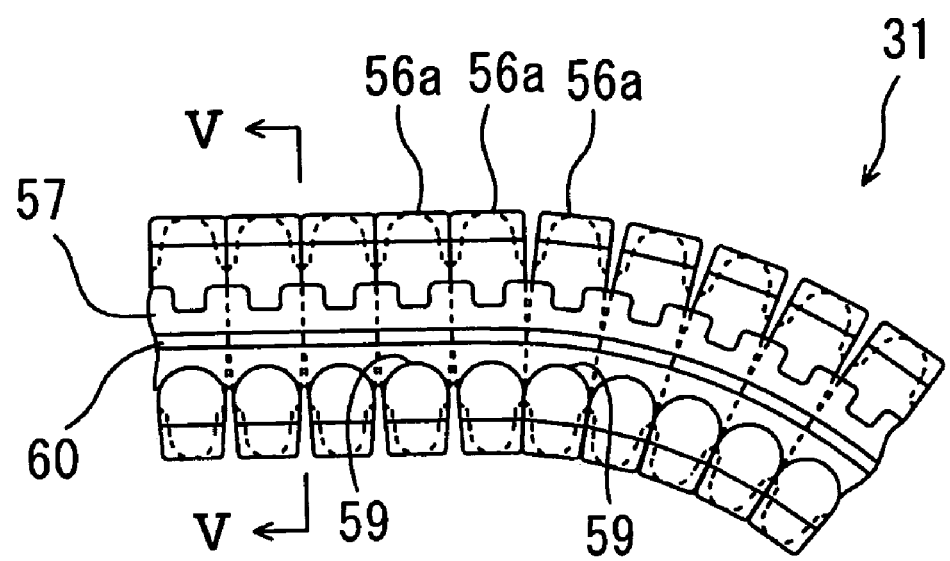

[Fig. 5]
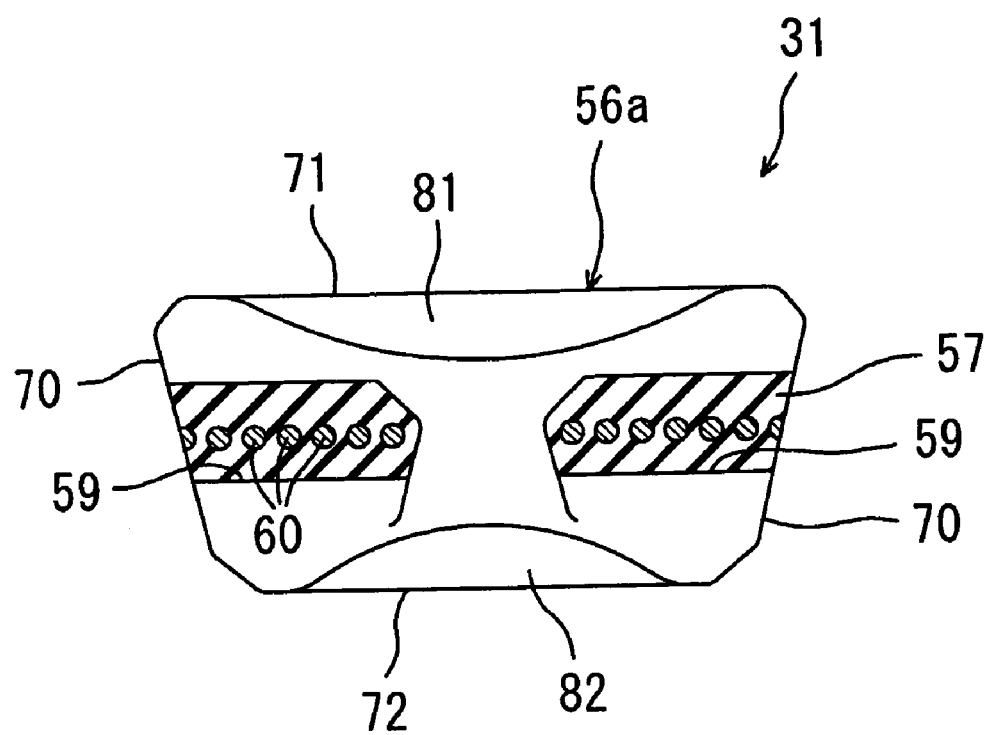

[Fig. 6]
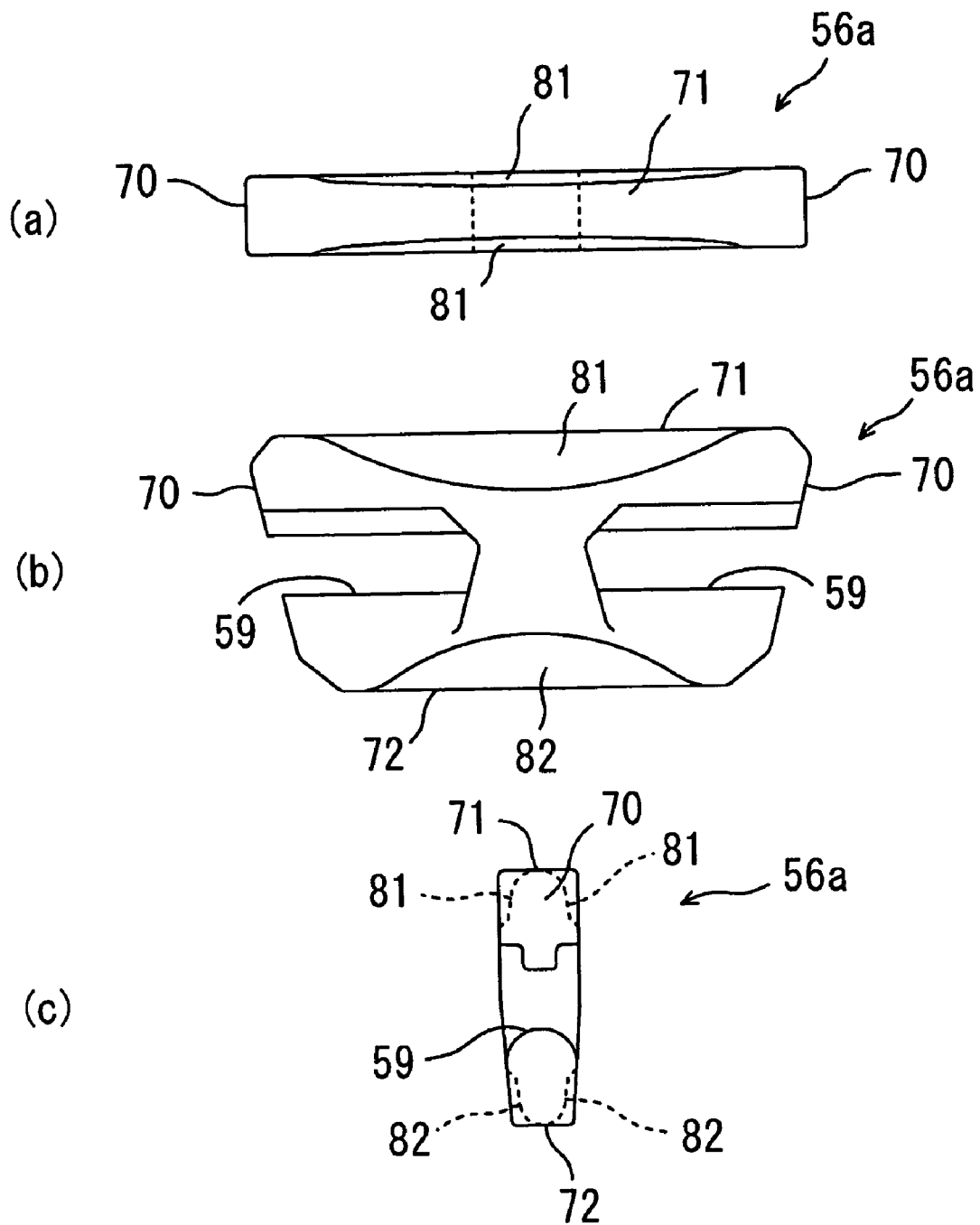

[Fig. 7]
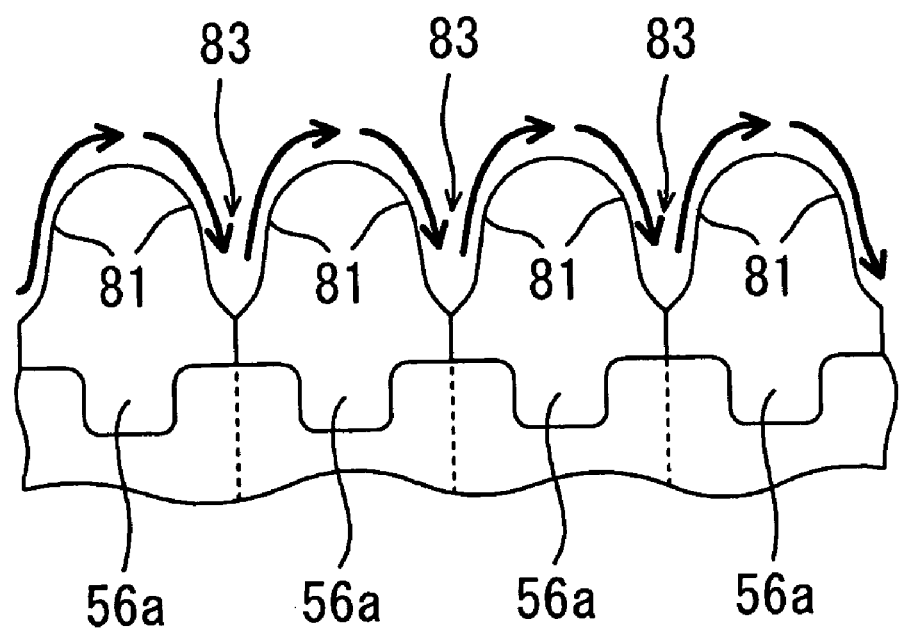

[Fig. 8]
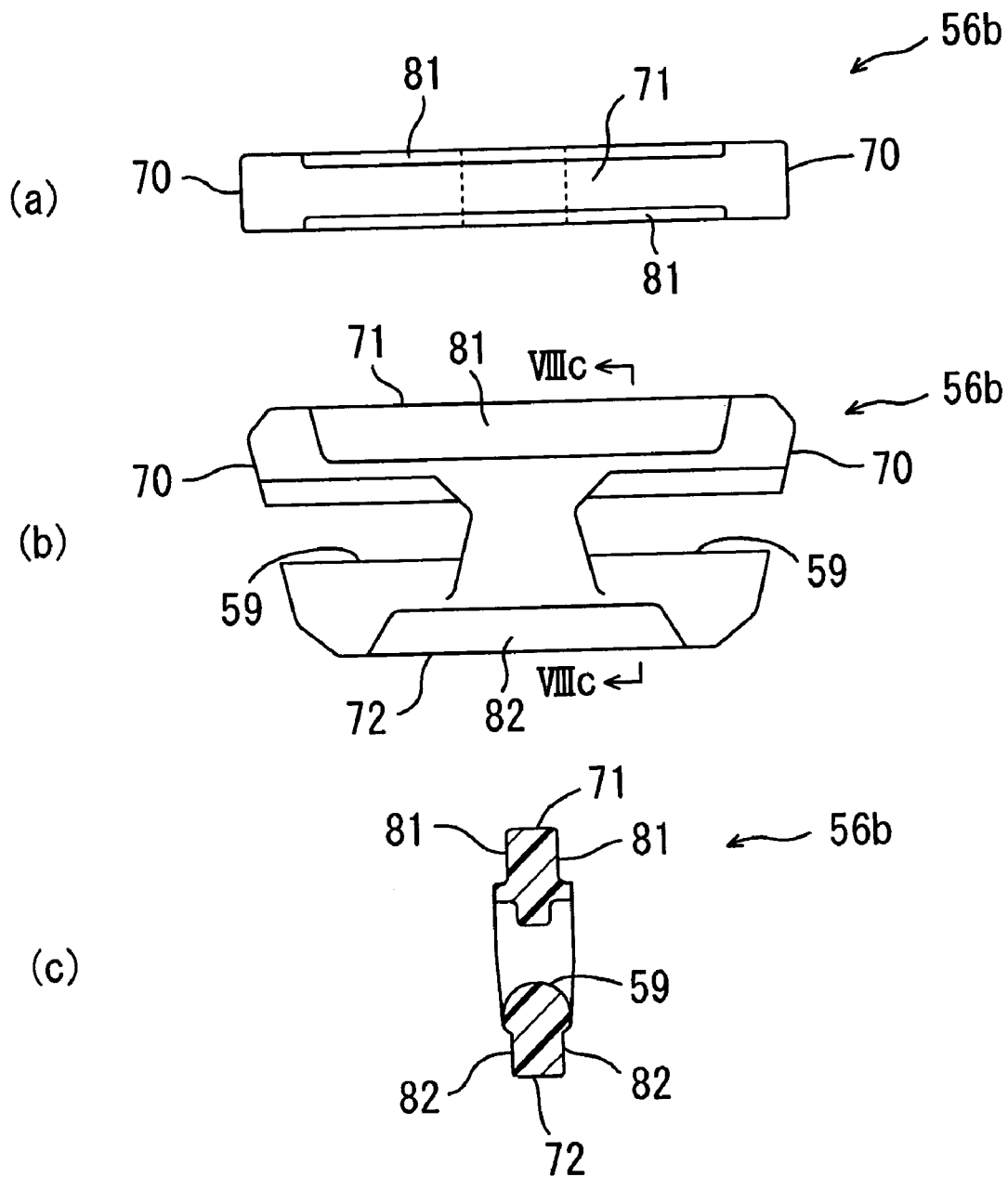

[Fig. 9]
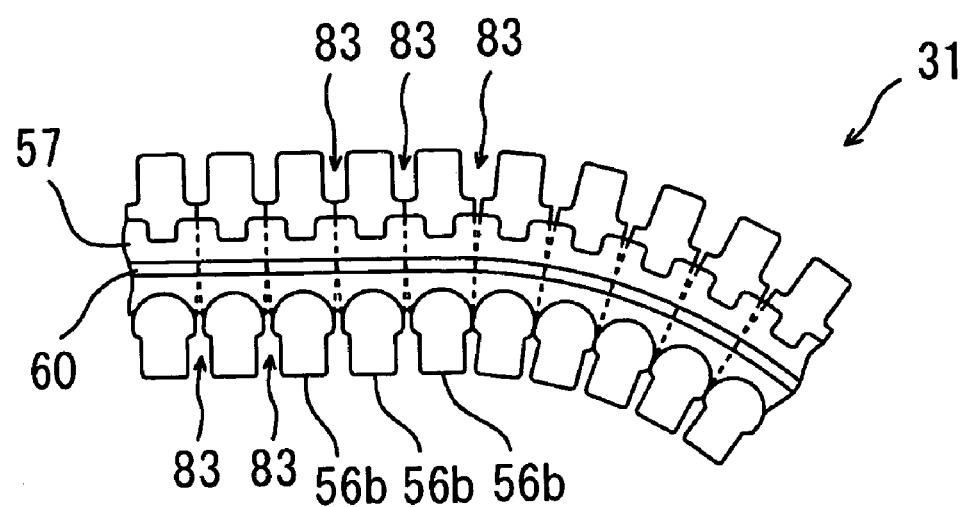

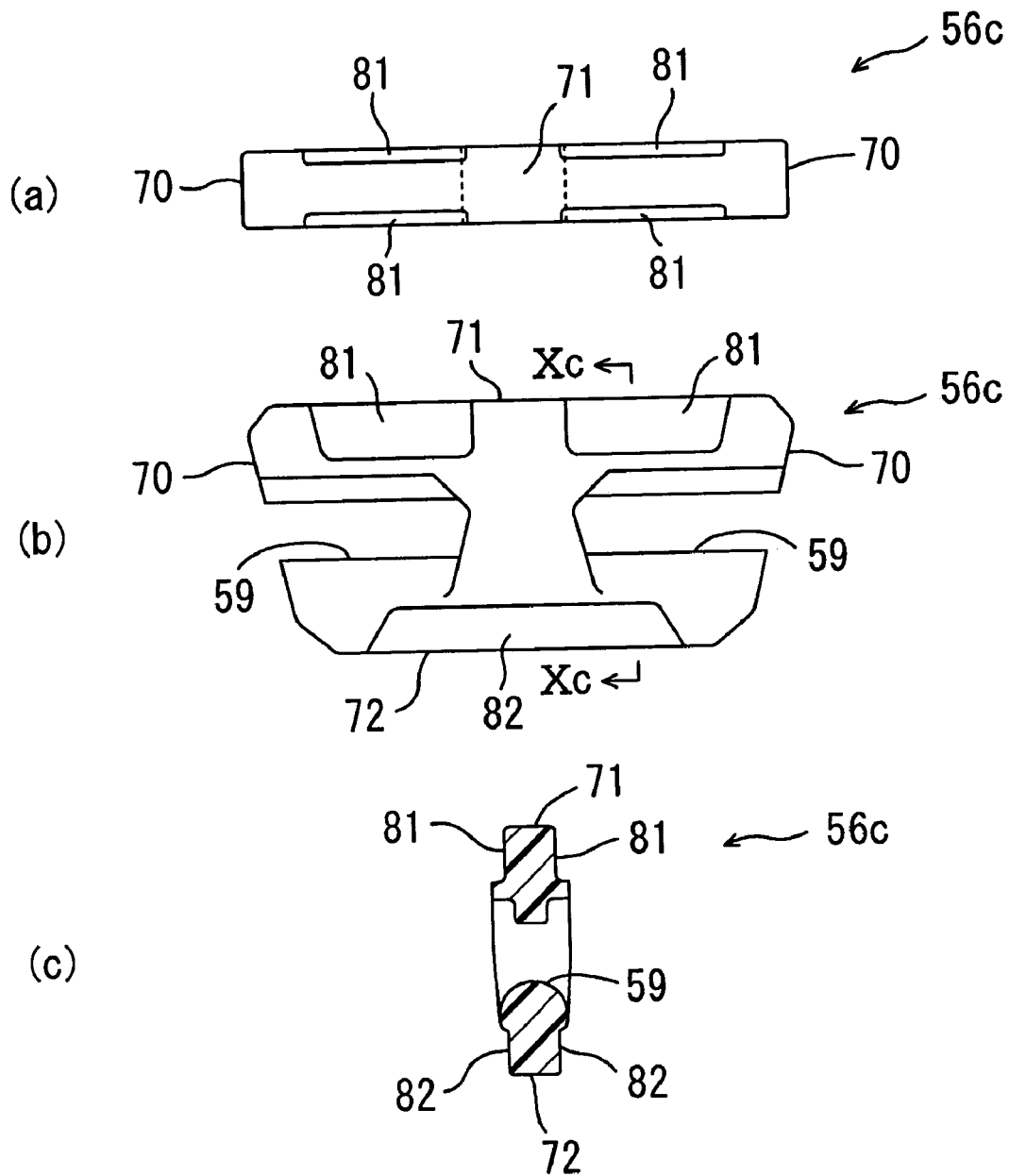
[Fig. 10]

[Fig. 11]
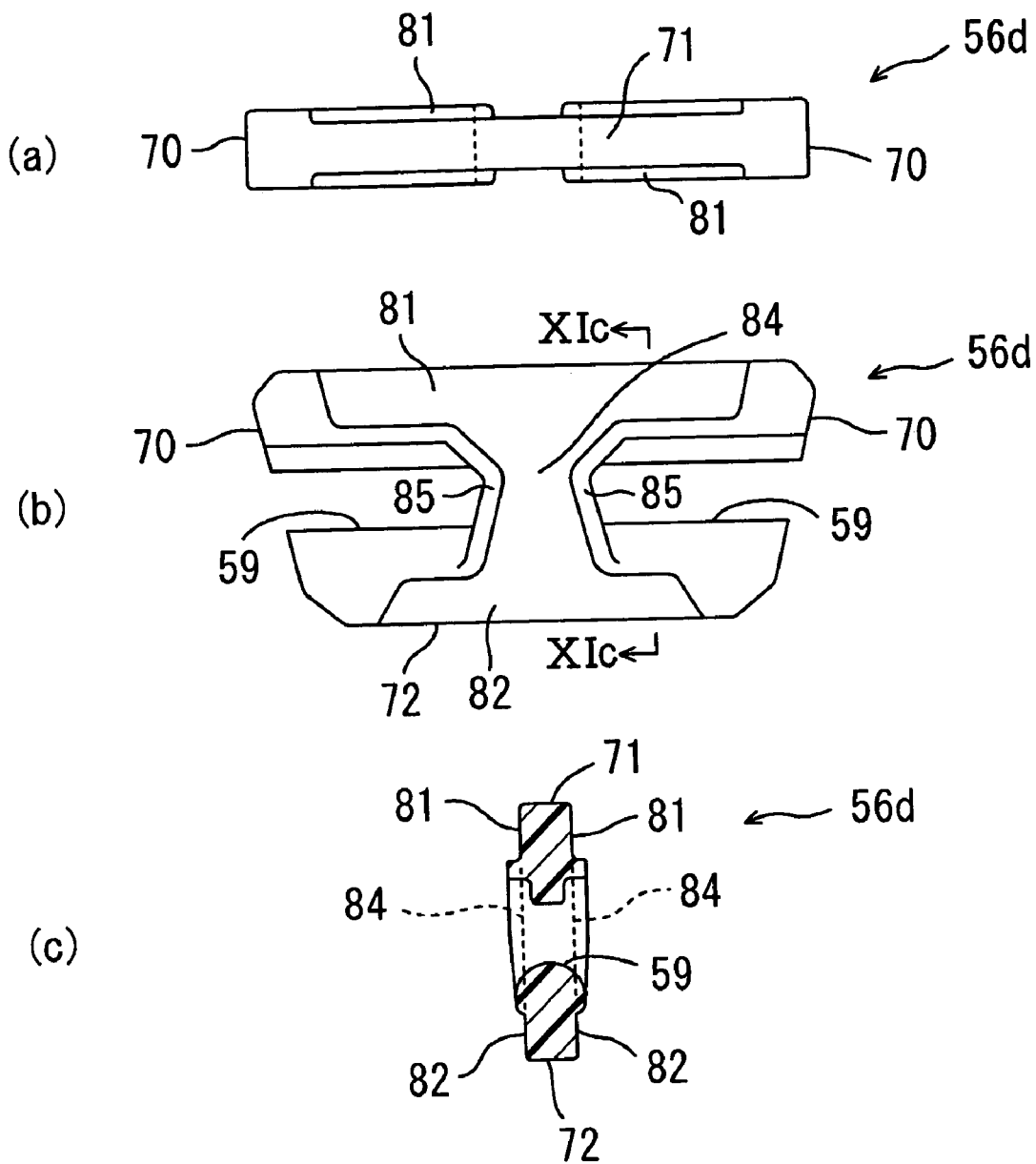

[Fig. 12]
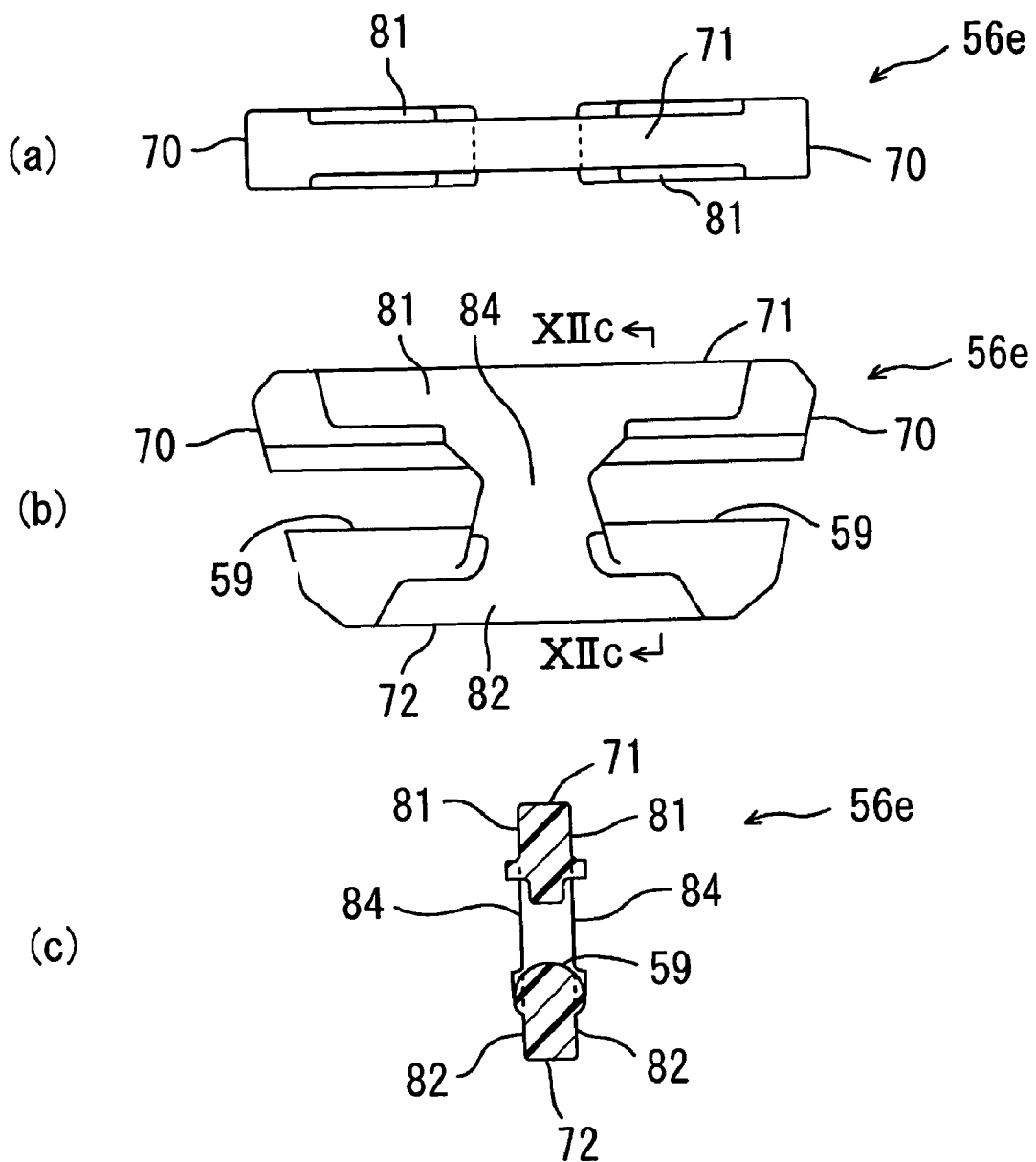

[Fig. 13]
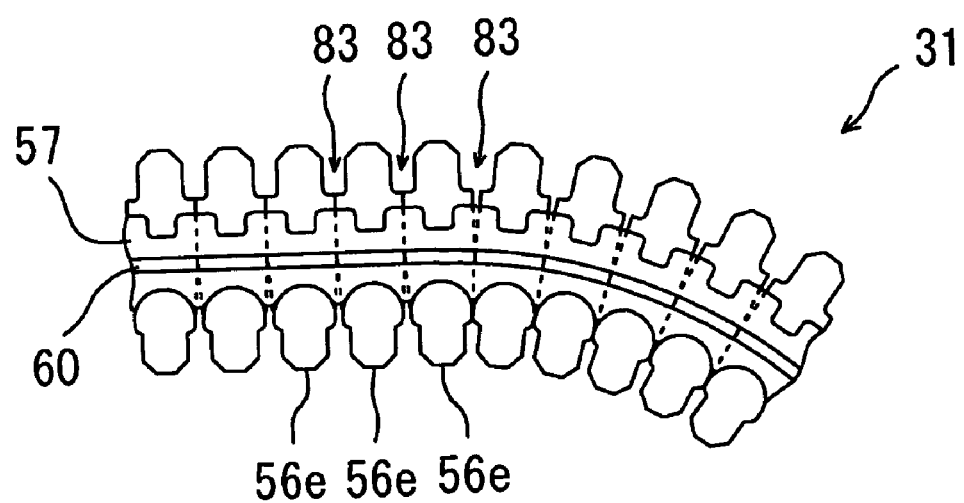

[Fig. 14]
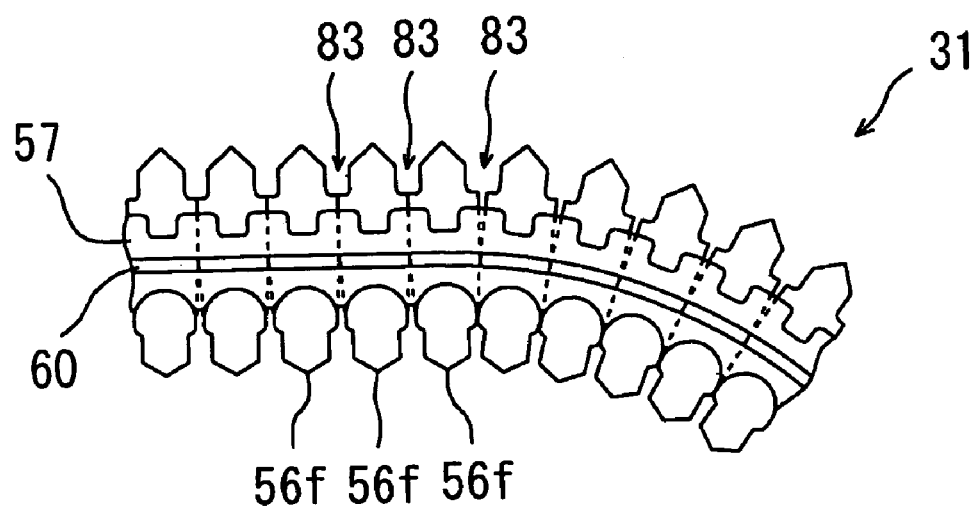

[Fig. 15]
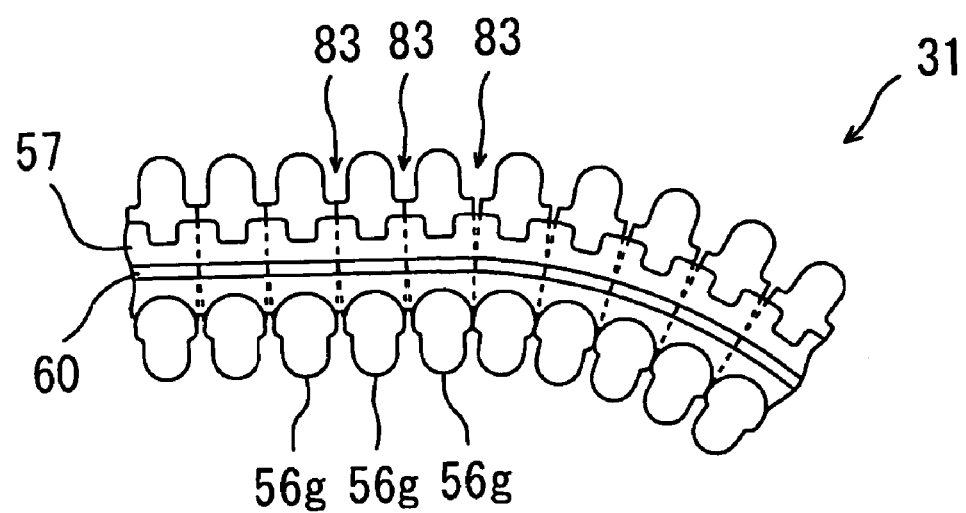

[Fig. 16]
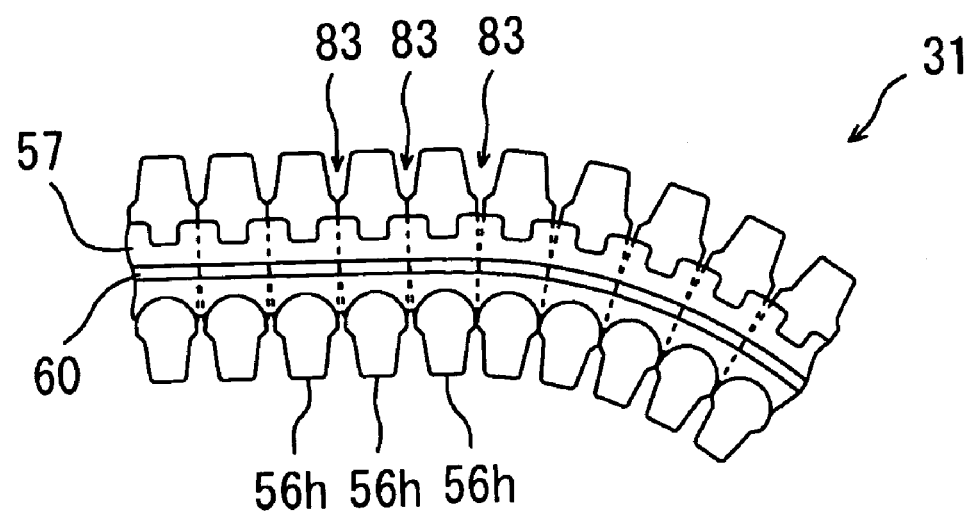

[Fig. 17]
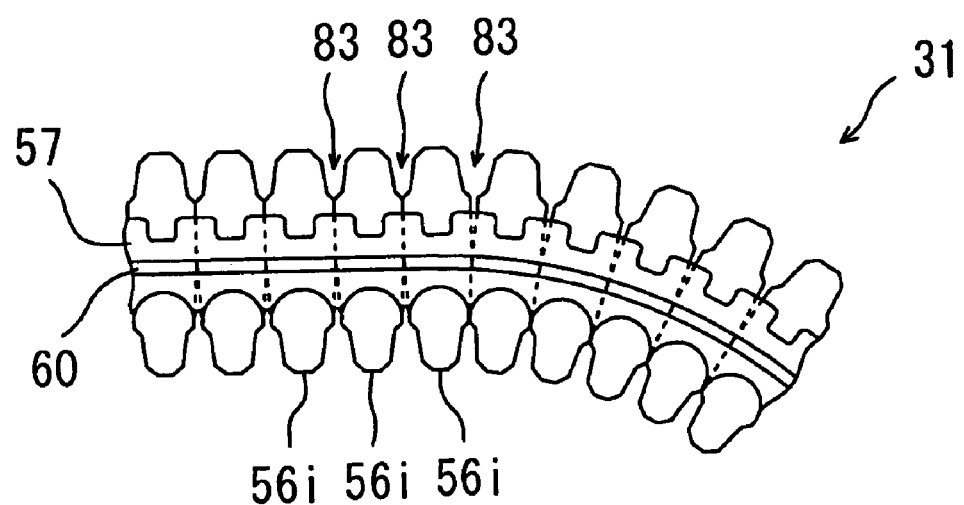

[Fig. 18]
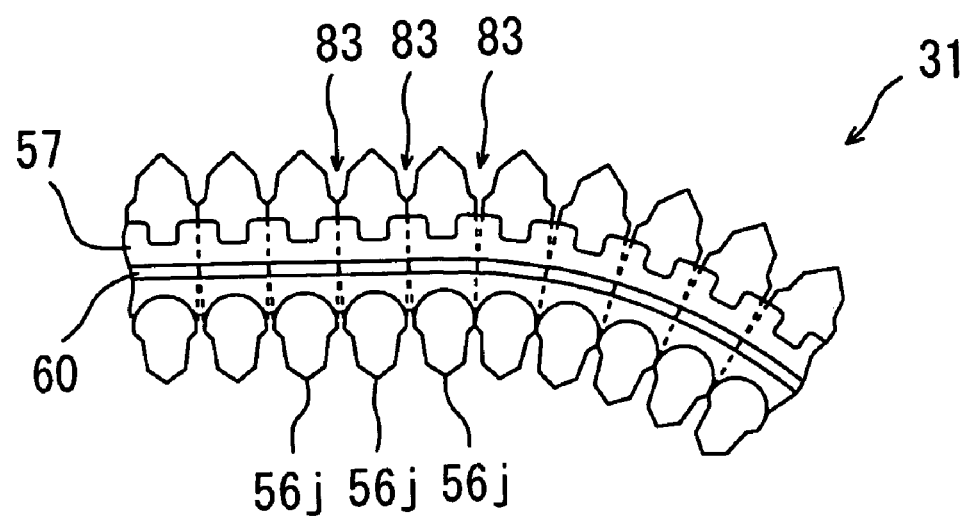

[Fig. 19]
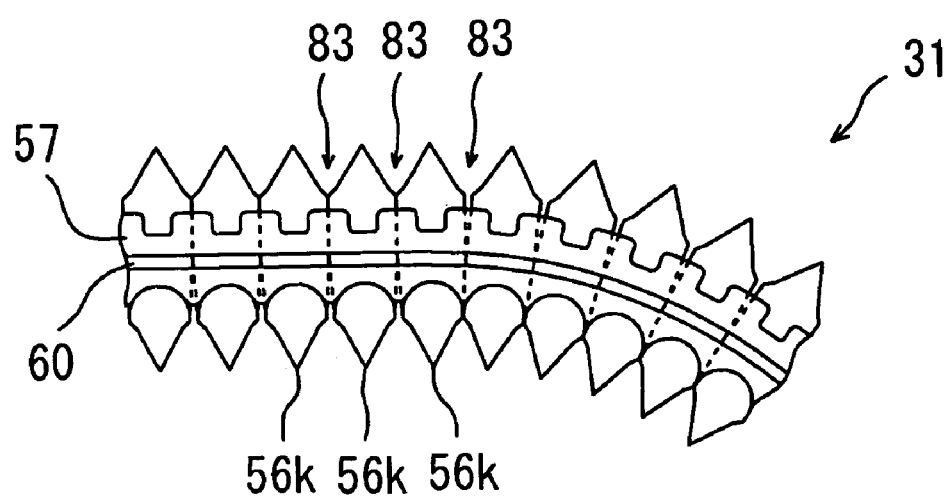

[Fig. 20]
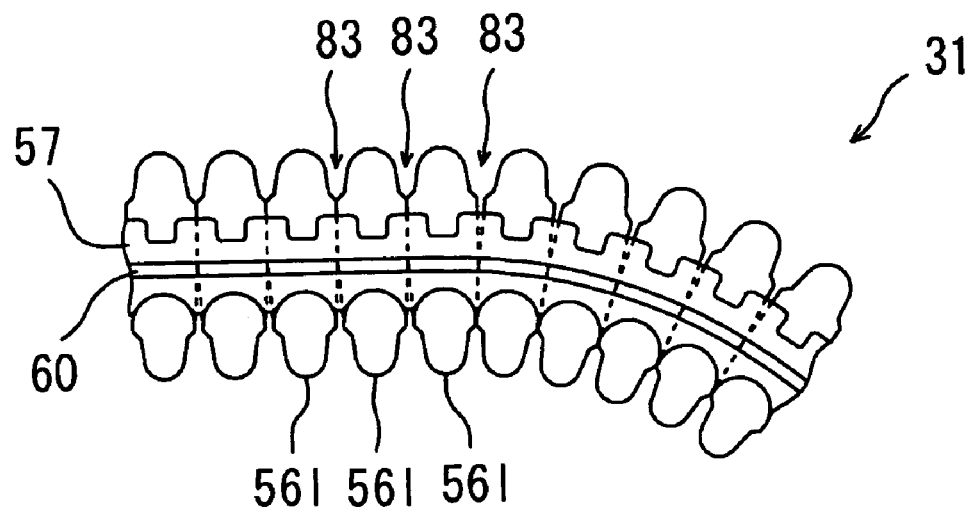

[Fig. 21]
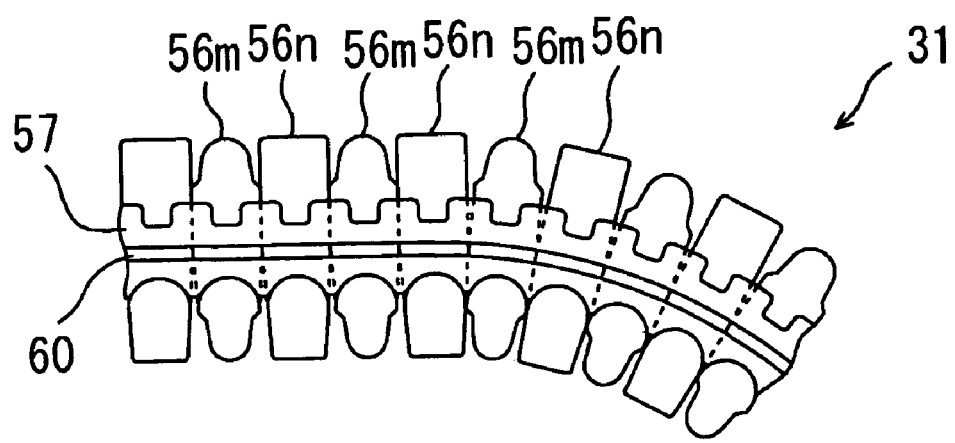

[Fig. 22]
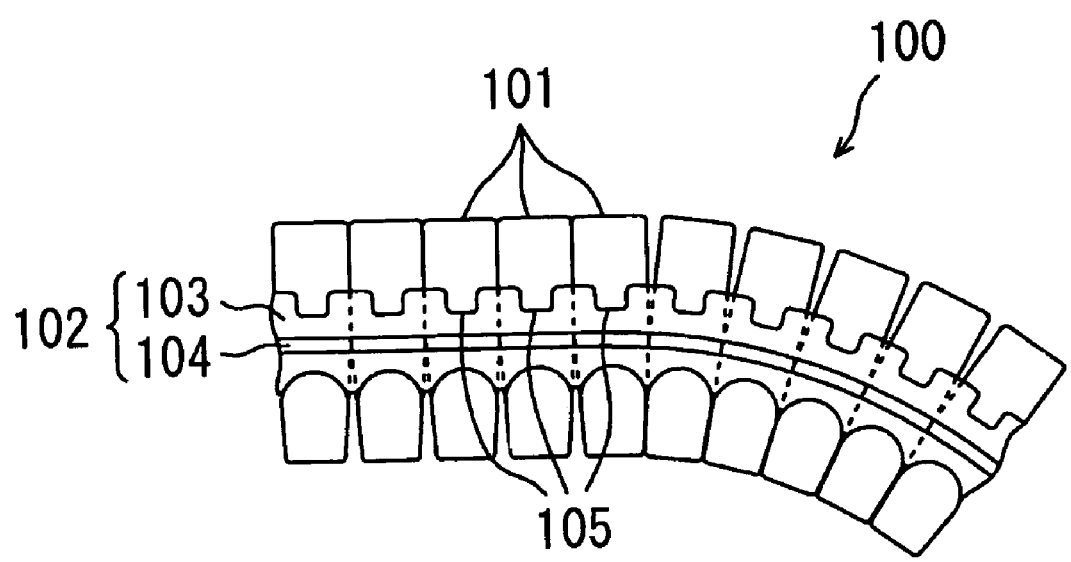

[Fig. 23]
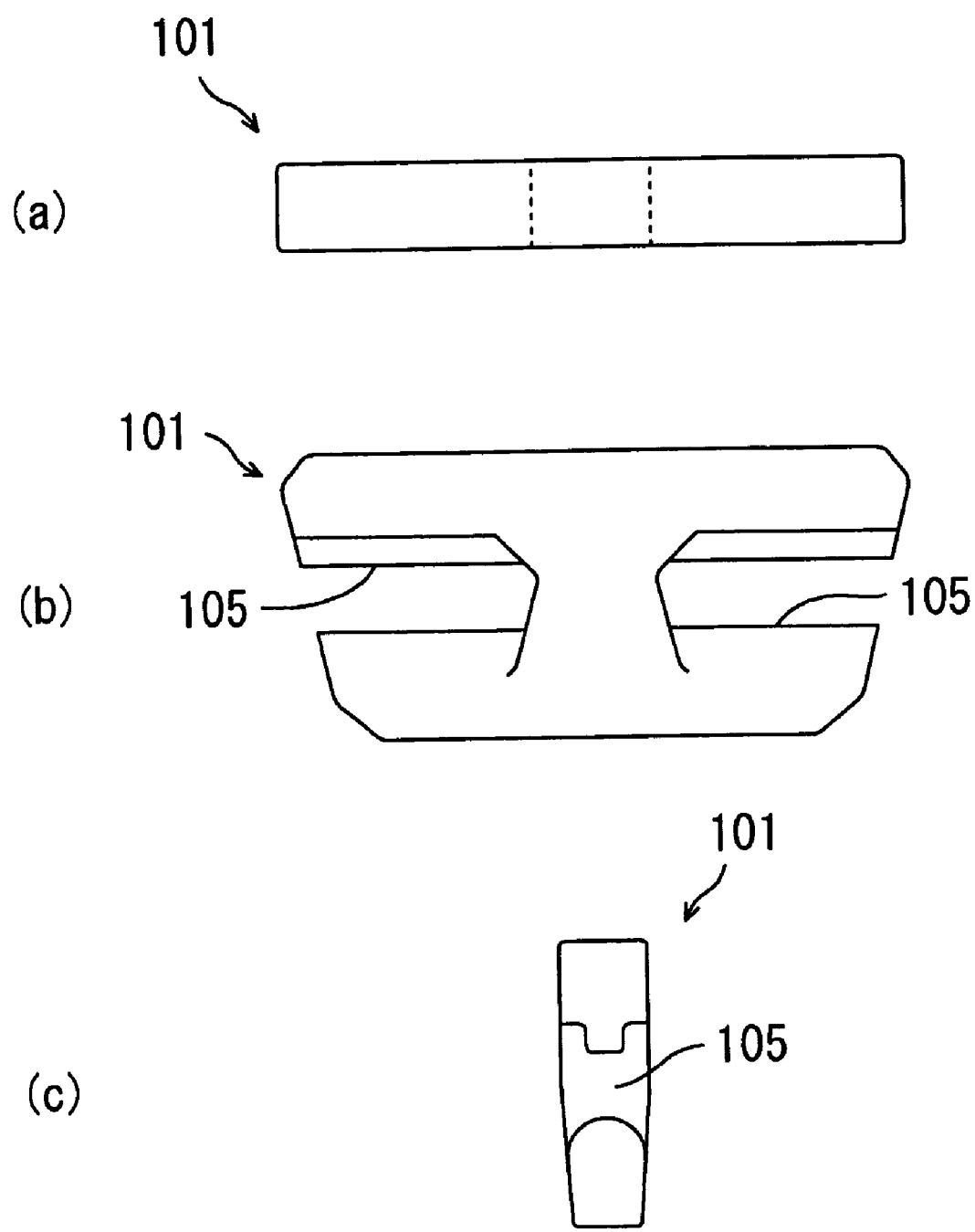

V-SHAPED BELT, BELT-TYPE TRANSMISSION, AND SADDLE TYPE-VEHICLE

BACKGROUND OF THE INVENTION

1. Field of the Invention

The present invention relates to a V-shaped belt, a belt-type transmission, and a saddle-type vehicle.

2. Description of Related Art

Conventionally, a V-shaped belt having a plurality of blocks and an endless connecting member for connecting the blocks has been used for a belt-type continuously variable transmission fitted to a motor bicycle or the like. As the blocks used for such a V-shaped belt, blocks made of metal such as aluminum, blocks obtained by coating a metal molded material with a resin, or the like have been known.

The V-shaped belt is used by winding itself around sheaves (pulleys) rotating at a high speed or the like. As a result, decrease in weight of the V-shaped belt has been required to facilitate the high-speed rotation. Therefore, in order to accomplish the decrease in weight of the V-shaped belt, it has been suggested that blocks made of resin or substantial resin (hereinafter, referred to as resin blocks) are used as the blocks (for example, see Japanese Patent JP-A-2002-147553).

The V-shaped belt disclosed in Japanese Patent JP-A-2002-147553 is described with reference to FIGS. 22 and 23. As shown in FIG. 22, the V-shaped belt 100 comprises a number of resin blocks 101 arranged in a line and an endless connecting member 102. As shown in FIG. 23(b), each resin block 101 has a falling H shape as seen from the front side and grooves 105 are formed inward in both sides of each resin block 101. As shown in FIG. 22, the connecting members 102 are impacted into the grooves 105 of each resin block 101. As a result, the resin blocks 101 are connected to each other through the connecting members 102. The connecting members 102 include a rubber 103 and cores 104 buried in the rubber 103. Although not shown, the V-shaped belt 100 is wound around a primary sheave and a secondary sheave of a belt-type continuously variable transmission.

A large amount of heat is generated in the V-shaped belt 100 due to friction with the sheaves. In addition, frictional heat is generated between the resin blocks 101 and the connecting member 102. Internal heat is generated in accordance with the unevenness of the connecting members when they are wound around the sheaves and the like. Accordingly, the heat easily increases the temperature of the V-shaped belt 100.

However, resin is a material having thermal conductivity lower than that of metal. As a result, in the V-shaped belt 100 employing the resin blocks 101, since heat can easily stay in the resin blocks 101, the temperatures of the resin blocks 101 and the connecting members 102 are easily increased. Therefore, the V-shaped belt 100 is not enough from the point of view of a heat-proof characteristic.

Therefore, there was suggested a V-shaped belt with an improved heat-radiating property. In Japanese Patent JP-UM-A-61-97647, it is disclosed that a V-shaped belt having falling H-shaped resin blocks is provided with depressions recessed downward in both sides of the top surface of the resin blocks. In the V-shaped belt, since the heat-radiating area can be enlarged by the depression and the thermally conductive distance between external air and engaging portions (portions in which the resin blocks and the connecting members engage with each other) which is a frictional heat source can be reduced, efficient radiation of the frictional heat is accomplished.

However, in the V-shaped belt disclosed in Japanese Patent JP-UM-A-61-97647, since the depressions recessed downward are formed in the top surfaces of the resin blocks, the area of both side surfaces of the resin blocks which contact the sheaves is reduced. As a result, a sufficient contact area cannot be guaranteed between the V-shaped belt and the sheaves, and thus it cannot be said to provide sufficient strength. Specifically, it is difficult to maintain a high rigidity in the arrangement direction of the resin blocks (longitudinal rigidity). On the contrary, when the size of the depressions is decreased in order to maintain sufficient strength, the heat-radiating area is reduced. Accordingly, a sufficient cooling effect cannot be obtained.

In Japanese Patent JP-A-61-286638, it is disclosed that a V-shaped belt is formed by integrally vulcanizing blocks and an endless belt body, clearances are formed between the neighboring blocks, and cooling air is introduced into the clearances between the blocks. Specifically, a V-shaped belt having falling H-shaped blocks and a V-shaped belt having blocks obtained by coupling upper blocks and lower blocks each other with pins are disclosed in Japanese Patent JP-A-61-286638. In the V-shaped belt having the falling H-shaped blocks, the thickness of both lateral ends of each block is smaller than that of the center thereof, and thus a clearance is formed between the neighboring blocks at the lateral ends of the block. On the other hand, in the V-shaped belt having the blocks consisting of the upper blocks and the lower blocks, a clearance is formed not between the neighboring lower blocks but between the neighboring upper blocks.

In the V-shaped belt having the falling H-shaped blocks disclosed in Japanese Patent JP-A-61-286638, since the sufficient contact area cannot be guaranteed between the sheaves and the V-shaped belt as described above, it is difficult to maintain the sufficient strength. In addition, since the clearances between the neighboring blocks reach the belt body in the V-shaped belt, the strength of the engaging portions of the blocks with the belt body is insufficient although the blocks and the belt body are integrally vulcanized.

In the V-shaped belt having the upper blocks and the lower blocks disclosed in Japanese Patent JP-A-61-286638, the lower blocks contact the sheaves but no clearance is formed between the neighboring lower blocks. As a result, it is possible to guarantee the sufficient contact area between the sheaves and the V-shaped belt but it is difficult to obtain a sufficient cooling effect. In the V-shaped belt, some degree of cooling effect may be obtained from the upper blocks. However, since the upper blocks and the lower blocks are individual members connected to each other with the pins, the effective cooling of the upper blocks cannot necessarily guarantee the cooling of the lower blocks.

As described above, it is difficult to allow the strength and the heat-radiating property of the resin blocks to stand together in the conventional V-shaped belt.

SUMMARY OF THE INVENTION

The present invention is contrived in view of the above-mentioned problems and it is an object of the present invention to improve the durability of the V-shaped belt by allowing the strength and the heat-radiating property of the resin blocks at a high level in the V-shaped belt having resin blocks and connecting members.

According to an aspect of the present invention, there is provided a V-shaped belt comprising: a plurality of resin blocks arranged in a direction; and an endless connecting member that extends in the arrangement direction of the resin blocks and that is impacted into the resin blocks to connect the resin blocks, wherein a depression recessed in the arrangement direction of the resin blocks and separated from the connecting member is formed in each resin block.

In the V-shaped belt, since the depression recessed in the arrangement direction is formed in each resin block, it is possible to enlarge the heat-radiating area of the resin blocks and to introduce the air between the resin blocks, thereby improving the heat-radiating property. In addition, since the depression is separated from the connecting member, the engagement strength between the resin blocks and the connecting member is not weakened depending upon the shapes of the depression, and thus it is possible to keep the strength of the V-shaped belt high. Therefore, it is possible to allow the strength and the heat-radiating property of the resin blocks to stand together at a high level, thereby improving the durability of the V-shaped belt.

According to another aspect of the present invention, there is provided a V-shaped belt comprising a plurality of resin blocks arranged in a direction, each resin block having grooves inwardly formed at vertical centers of both lateral surfaces, and an endless connecting member that extends in the arrangement direction of the resin blocks and is impacted into the grooves of the resin blocks to connect the resin blocks, wherein a depression exposed to air is formed at a lateral center of each resin block.

The inventors found out that the portion in a so-called falling H-shaped resin block in which heat can easily stay is the center portion, and thus the entire resin block can be efficiently cooled by cooling the center portion. In the V-shaped belt, the depression exposed to the air is formed at the center of each falling H-shaped resin block. As a result, since the portions in which the heat can easily stay can be directly cooled, it is possible to obtain a sufficient heat-radiating property without enlarging the depression. Therefore, it is possible to allow the strength and the heat-radiating property of the resin blocks to stand together at a high level, thereby improving the durability of the V-shaped belt.

According to another aspect of the present invention, there is provided a V-shaped belt comprising a plurality of resin blocks arranged in a direction, each resin block having grooves inwardly formed at vertical centers of both lateral surfaces, and an endless connecting member that extends in the arrangement direction of the resin blocks and is impacted into the grooves of the resin blocks to connect the resin blocks, wherein a depression exposed to air and separated from both lateral surfaces of the resin blocks is formed in each resin block.

In the V-shaped belt, since the depression exposed to the air is formed in each resin block, the heat-radiating property is improved. In addition, since the depression is separated from both lateral surfaces of each resin block, it is possible to sufficiently secure the contact area between the resin block and the sheaves. As a result, it is possible to keep the strength of the resin blocks high, in spite of the formation of the depression. Therefore, it is possible to allow the strength and the heat-radiating property of the resin blocks to stand together at a high level, thereby improving the durability of the V-shaped belt.

According to another aspect of the present invention, there is provided a V-shaped belt comprising a plurality of resin blocks that contains carbon fiber and is arranged in a direction, and an endless connecting member that extends in the arrangement direction of the resin blocks and that is impacted into the resin blocks to connect the resin blocks, wherein a depression exposed to air is formed in each resin block.

In one aspect of the present invention, the carbon fiber has a thermal conduction characteristic more excellent than the resin blocks and considered that the carbon fiber is added to the resin blocks at the same time as forming the depressions in the resin blocks. In the V-shaped belt, the heat in the resin blocks can be effectively delivered to the surface of the resin blocks, that is, the surfaces of the depressions, through the carbon fiber, thereby improving the heat-radiating property. In addition, since the carbon fiber functions as a reinforcing material, it is possible to keep the strength of the resin blocks high in spite of the formation of the depressions. Therefore, it is possible to allow the strength and the heat-radiating property of the resin blocks to stand together at a high level, thereby improving the durability of the V-shaped belt.

According to the present invention described above, it is possible to allow the strength and the heat-radiating property of the resin blocks to stand together, thereby enhancing the durability of the V-shaped belt. Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motor bicycle according to an embodiment of the present invention;

FIG. 2 is a side view of a power unit;

FIG. 3 is a cross-sectional view of a belt-type continuously variable transmission;

FIG. 4 is a side view of a V-shaped belt according to a first embodiment;

FIG. 5 is a cross-sectional view taken along a line V-V of FIG. 4;

FIG. 6 is an explanatory diagram of a resin block according to the first embodiment, where FIG. 6(a) is a plan view, FIG. 6(b) is a front view, and FIG. 6(c) is a side view;

FIG. 7 is a schematic diagram illustrating a flow of air in the V-shaped belt;

FIG. 8 is an explanatory diagram of a resin block according to a second embodiment, where FIG. 8(a) is a plan view, FIG. 8(b) is a front view, and FIG. 8(c) is a cross-sectional view taken along a line VIIIc-VIIIc of FIG. 10(b);

FIG. 9 is a vertical cross-sectional view of the V-shaped belt according to the second embodiment;

FIGS. 10(a)-10(c) are explanatory diagrams of a resin block according to a third embodiment, wherein FIG. 10(a) is a plan view, FIG. 10(b) is a front view and FIG. 10(c) is a cross-sectional view taken along a line Xc-Xc of FIG. 10(b);

FIG. 11(a)-11(c) are explanatory diagrams of a resin block according to a fourth embodiment, wherein FIG. 11(a) is a plan view, FIG. 11(b) is a front view and FIG. 11(c) is a cross-sectional view taken along a line XIc-XIc of FIG. 11(b);

FIG. 12(a)-12(c) are explanatory diagrams of a resin block according to a fifth embodiment, wherein FIG. 12(a) is a plan view, FIG. 12(b) is a front view and FIG. 12(c) is a cross-sectional view taken along a line XIIc-XIIc of FIG. 12(b);

FIG. 13 is a longitudinal sectional view of the V-shaped belt according to a sixth embodiment;

FIG. 14 is a longitudinal sectional view of the V-shaped belt according to a seventh embodiment;

FIG. 15 is a longitudinal sectional view of the V-shaped belt according to an eighth embodiment;

FIG. 16 is a longitudinal sectional view of the V-shaped belt according to a ninth embodiment;

FIG. 17 is a longitudinal sectional view of the V-shaped belt according to a tenth embodiment;

FIG. 18 is a longitudinal sectional view of the V-shaped belt according to an eleventh embodiment;

FIG. 19 is a longitudinal sectional view of the V-shaped belt according to a twelfth embodiment;

FIG. 20 is a longitudinal sectional view of the V-shaped belt according to a thirteenth embodiment.

FIG. 21 is a longitudinal sectional view of the V-shaped belt according to another embodiment;

FIG. 22 is a side cross-sectional view of a conventional V-shaped belt; and

FIG. 23 are explanatory diagrams of a conventional resin block, wherein FIG. 23(*a*) is a plan view, FIG. 23(*b*) is a front view and FIG. 23(*c*) is a side view.

DETAILED DESCRIPTION OF THE INVENTION

Now, exemplary embodiments of the present invention will be described with reference to the drawings, wherein like numerals refer to like parts throughout.

FIG. 1 shows a motor bicycle 1 which is an example of a saddle-type vehicle. The motor bicycle 1 has a frame 2. The frame 2 comprises a head steering pipe 3, a pair of left and right main pipes 4, and a seat rail 5 placed on each main pipe 4. The steering head pipe 3 is positioned at the front end of the frame 2 and supports a front wheel 7 through a front fork 6.

Each main pipe 4 extends backwardly from the steering head pipe 3. Each main pipe 4 has a front half portion 4*a* extending backward and obliquely downward from the steering head pipe 3, a central portion 4*c* extending backward and approximately horizontally from the front half portion 4*a*, and a rear half portion 4*b* backward and obliquely upward from the central portion 4*c*.

The seat rail 5 is placed across the front half portion 4*a* and the rear half portion 4*b* of the pipe 4. The seat rail 5 supports a seat 8 on which a driver rides. The frame 2 is covered with a vehicle cover 9. The vehicle cover 9 is disposed continuous to the lower end of the seat 8.

A rear arm bracket 10 is fixed to the central portion 4*c* of each main pipe 4. The rear arm bracket 10 is protruded downward from the central portion 4*c* of each main pipe 4. The rear arm bracket 10 supports a rear arm 11 extending backward. The rear arm 11 is pivotable upward and downward on a support point of the rear arm bracket 10. A rear wheel 12 is supported by the rear end of the rear arm 11.

The frame 2 supports a power unit 13 for driving the rear wheel 12. The power unit 13 includes a 4 cycle single-cylinder engine 14 and a belt-type continuously variable transmission 15 (see FIG. 2). The power unit 13 is covered with the vehicle cover 9.

The engine 14 is suspended from and supported by the front half portion 4*a* of the main pipes 4. The engine 14 includes a crank case 16 and a cylinder 17 connected to the crank case 16.

The crank case 16 receives a crank shaft 18 and a gear reducer (not shown). As shown in FIG. 3, the crank shaft 18 is supported through bearings 19*a* and 19*b* by the crank case 16. The crank shaft 18 is horizontally disposed along the vehicle-width direction (lateral direction in FIG. 3) of the motor bicycle 1.

As shown in FIG. 1, an output end of the gear transmission is provided with a drive sprocket 20. The drive sprocket 20 is disposed in the rear of the crank shaft 18. The center of the rear wheel 12 is provided with a driven sprocket 21. A chain 22 is wound between the drive sprocket 20 and the driven sprocket 21.

The cylinder 17 of the engine 14 is protruded upward from the crank case 16 along the front half portion 4*a* of the main pipes 4. As shown in FIG. 2, the cylinder 17 receives a piston 23. As shown in FIG. 3, the crank shaft 18 is provided with crank webs 25*a* and 25*b*. A crank pin 24*a* is provided between the crank webs 25*a* and 25*b*. The piston 23 is connected to the crank pin 24*a* through a connecting rod 24.

As shown in FIGS. 2 and 3, The belt-type continuously variable transmission (hereinafter, referred to as "CVT") 15 is disposed at the right side of the crank case 16. The right side surface of the crank case 16 is covered with a transmission case 28 and the CVT 15 is received in the transmission case 28.

The CVT 15 comprises a primary sheave 29, a secondary sheave 30, and a V-shaped belt 31 wound on the primary sheave 29 and the secondary sheave 30. The primary sheave 29 is positioned at the front side in the transmission case 28 and is supported by an input shaft 32. As shown in FIG. 3, the input shaft 32 is integrally formed with the crank shaft 18. A journal portion 18*a* positioned at the right end of the crank shaft 18 extends to right toward the transmission case 28 (not shown in FIG. 3). The extending portion also serves as the input shaft 32.

The primary sheave 29 includes a fixed plate 34*a* and a sliding plate 34*b* opposed to the fixed plate 34*a*. The fixed plate 34*a* is fixed to the end of the input shaft 32. Accordingly, the fixed plate 34*a* rotates integrally with the input shaft 32. On the other hand, the sliding plate 34*b* is slidable in the axis direction of the input shaft 32. The sliding plate 34*b* has a cylinder-shaped boss portion 35. The boss portion 35 is supported through a collar 36 by the input shaft 32. As a result, the sliding plate 34*b* is slidable in the direction in which the sliding plate 34*b* moves closer to or apart from the fixed plate 34*a* and is rotatable about the input shaft 32.

The primary sheave 29 has a pair of sandwiching surfaces 37*a* and 37*b* between which the V-shaped belt 31 is sandwiched. Specifically, the sandwiching surface 37*a* is formed at the left side of the fixed plate 34*a* and the sandwiching surface 37*b* is formed at the right side of the sliding plate 34*b*. The sandwiching surfaces 37*a* and 37*b* are formed in a cone shape and are opposed to each other. The sandwiching surfaces 37*a* and 37*b* define a belt groove 38 having a V-shaped section between the fixed plate 34*a* and the sliding plate 34*b*. The width L1 of the belt groove 38 can be adjusted by means of sliding of the sliding plate 34*b*.

A cam plate 39 is fixed to the left outer circumferential portion of the input shaft 32. Therefore, the cam plate 39 rotates along with the input shaft 32. The cam plate 39 is opposed to the sliding plate 34*b* in the lateral direction. The sliding plate 34*b* is mounted to the cam plate 39 and is slidable in the axis direction of the input shaft 32. As a result, the cam plate 39 and the sliding plate 34*b* are movable in the direction in which they get closer to or apart from each other while rotating together.

A cam surface 40 opposed to the cam plate 39 is formed at the left side of the sliding plate 34*b*. A plurality of weight rollers 41 is provided between the sliding plate 34*b* and the cam plate 39 (only one weight roller 41 is shown in FIG. 3). When the crank shaft 18 rotates, a centrifugal force is generated in the weight roller 41. The weight roller 41 moves along the cam surface 40 in response to the centrifugal force. By means of the movement, a force to the right side is applied to the sliding plate 34*b* from the weight roller 41, and thus the sliding plate 34*b* slides in the axis direction of the input shaft 32. As a result, the width L1 of the belt groove 38 varies.

The secondary sheave 30 is disposed at the rear side in the transmission case 28. The secondary sheave 30 is supported by an output shaft 42. The output shaft 42 is disposed parallel to the input shaft 32 and is connected to an input end of the gear reducer through an automatic centrifugal clutch (not shown).

The secondary sheave 30 has a fixed plate 45a and a sliding plate 45b. The rotation center of the fixed plate 45a is provided with a cylinder-shaped collar 46. The collar 46 engages with the outer circumferential surface of the output shaft 42. By means of the engagement, the fixed plate 45a and the output shaft 42 rotate together.

The rotation center of the sliding plate 45b is provided with a sleeve 47. The sleeve 47 is fitted onto the outer circumferential surface of the collar 46 to be slidable in the axis direction thereof. A plurality of engaging grooves 48 is formed in the sleeve 47. The engaging grooves 48 extend in the axis direction of the sleeve 47 and are arranged in the circumferential direction of the sleeve 47 with a separation.

The collar 46 has a plurality of engaging pins 49. The engaging pins 49 are protruded in the outward radial direction of the collar 46 and are slidably impacted into the engaging grooves 48 of the sleeve 47. As a result, the fixed plate 45a and the sliding plate 45b rotate together and are movable in the direction in which they get closer to or apart from each other.

The secondary sheave 30 has a pair of sandwiching surfaces 51a and 51b between where the V-shaped belt 31 is sandwiched. Specifically, the sandwiching surface 51a is formed at the right side of the fixed plate 45a and the sandwiching surface 51b is formed at the left side of the sliding plate 45b. The sandwiching surfaces 51a and 51b are formed in a cone shape and are opposed to each other. The sandwiching surfaces 51a and 51b define a belt groove 52 having a V-shaped section between the fixed plate 45a and the sliding plate 45b. The width L2 of the belt groove 52 can be adjusted by means of sliding of the sliding plate 45b.

A spring bearing 53 is fixed to the right end of the collar 46. The spring bearing 53 is laterally opposed to the sliding plate 45b. A compression coil spring 54 is disposed between the spring bearing 53 and the sliding plate 45b. The spring 54 biases the sliding plate 45b toward the fixed plate 45a.

As shown in FIG. 3, the V-shaped belt 31 is wound around the primary sheave 29 and the secondary sheave 30. Specifically, the V-shaped belt 31 is impacted into the belt groove 38 of the primary sheave 29 and the belt groove 52 of the secondary sheave 30. The detailed construction of the V-shaped belt 31 will be described in greater detail herein below.

In a state where the number of rotation of the crank shaft 18 is small (for example, in a state where the engine 14 is under idling or the like), the centrifugal force acting on the weight roller 41 is small. Accordingly, the weight roller 41 is positioned at the inner radial side of the primary sheave 29. In this state, the sliding plate 34b is most apart from the fixed plate 34a, and the width L1 of the belt groove 38 is the maximum. As a result, the winding diameter of the V-shaped belt 31 in the primary sheave 29 is the minimum.

On the contrary, in the secondary sheave 30, the sliding plate 45b is biased toward the fixed plate 45a by the spring 54, and thus the belt width L2 is the minimum. As a result, the V-shaped belt 31 impacted into the belt groove 52 is extruded toward the outer circumferential portion of the secondary sheave 30. Consequently, the winding diameter of the V-shaped belt 31 in the secondary sheave 30 is the maximum.

In this way, in the state where the number of rotation of the crank shaft 18 is small, the winding diameter in the primary sheave 29 is the minimum and the winding diameter in the secondary sheave 30 is the maximum. As a result, the transmission ratio of the CVT 15 is the maximum.

On the other hand, when the number of rotation of the crank shaft 18 is increased, the centrifugal force acting on the weight roller 41 is increased, and thus the weight roller 41 moves in the outward radial direction of the sliding plate 34b.

As a result, the sliding plate 34b is pressed to right side by the weight roller 41 and slides toward the fixed plate 34a. Consequently, the width L1 of the belt groove 38 becomes smaller slowly. Then, the V-shaped belt 31 sandwiched between the sandwiching surfaces 37a and 37b is extruded in the outward radial direction of the primary sheave 29, and thus the winding diameter of the V-shaped belt 31 in the primary sheave 29 is increased.

On the contrary, in the secondary sheave 30, the V-shaped belt 31 is pulled in the inward radial direction of the secondary sheave 30 to be tight, with increase in winding diameter in the primary sheave 29. Accordingly, the force acting to the right side is given to the sliding plate 45b from the V-shaped belt 31, and thus the sliding plate 45b slides against the biasing force of the spring 54 in the direction in which the sliding plate 45b gets apart from the fixed plate 45a. As a result, the width L2 of the belt groove 38 becomes greater slowly. Consequently, the winding diameter of the V-shaped belt 31 in the secondary sheave 30 is decreased.

In this way, when the number of rotation of the crank shaft 18 is increased, the winding diameter in the primary sheave 29 is increased, and the winding diameter in the secondary sheave 30 is decreased. Accordingly, in the CVT 15 described hitherto, the transmission ratio varies automatically and continuously with the increase in the number of rotation of the crank shaft 18. In addition, the transmission ratio of the CVT 15 is the minimum when the winding diameter in the primary sheave 29 is the maximum.

Next, the detailed construction of the V-shaped belt 31. As shown in FIGS. 4 and 5, the V-shaped belt 31 comprises a plurality of resin blocks 56a arranged in a direction and a pair of connecting members 57 for connecting the resin blocks 56a. In the following description, the longitudinal direction, the lateral direction, and the vertical direction of the resin blocks 56a are defined as follows for the purpose of convenient explanation. That is, the longitudinal direction denotes the arrangement direction of the resin blocks 56a. The surfaces of the resin blocks 56a contacting the sheaves 29 and 30 are denoted by lateral surfaces. The portion positioned at the outside in the diameter direction of the sheaves 29 and 30 when the V-shaped belt 31 is wounded around the sheaves 29 and 30 is referred to as an upper portion, and the portion positioned at the inside in the diameter direction is referred to as a lower portion. However, the respective directions described above are, in one aspect, defined for the purpose of convenient explanation and do not necessarily refer to the directions when the V-shaped belt is in use.

As shown in FIGS. 6(a) to 6(c), each resin block 56a is made of a thin plate having a small longitudinal width and has both lateral surfaces 70, an upper surface 71, and a lower surface 72. As shown in FIG. 6(b), the lateral length of the resin block 56a is decreased from the upper surface 71 to the lower surface 72, and the resin block 56a is formed to correspond to the V shape of the belt grooves 38 and 52 of the sheaves 29 and 30. Grooves 59 are recessed inward in the vertical centers of both lateral surfaces 70 of the resin block 56a. The grooves 59 are used to impact the connecting members 57 thereto. In the state where the connecting members 57 are impacted into the resin block 56a, the groove 59 is not exposed to the air.

On the other hand, depressions 81 and 82 exposed to the air are formed in the upper surface 71 and the lower surface 72 of the resin block 56a. The depressions 81 and 82 are formed from both laterals to the center of the resin block 56a and recessed in the longitudinal direction (see FIG. 6(a)). The depressions 81 and 82 are formed in the front surface and the rear surface of the resin block 56a, respectively. The longitudinal widths of the upper portion and the lower portion of the resin block 56a are gradually decreased from both laterals to the center. However, the depressions 81 and 82 are formed at the center rather than at both laterals and are not formed at both laterals. Therefore, only both laterals of the resin block 56a, that is, the portions contacting the sheaves 29 and 30, have a width greater than other portions by a width which the depressions are not formed.

In addition, as shown in FIG. 6(*b*), the depressions 81 and 82 are vertically recessed from both laterals of the resin block 56a to the center. That is, the depressions 81 and 82 are recessed longitudinally and vertically. The depressions 81 and 82 are inwardly recessed in the lateral section of the resin block 56a (the section perpendicular to the arrangement direction of the resin block 56a). In one embodiment, the degree of recession is increased from both laterals of the resin block 56a to the center and the depressions 81 and 82 are most greatly recessed at the lateral center.

As shown in FIG. 6(*c*), the upper end and the lower end of the resin block 56a in which the depressions 81 and 82 are formed is tapered toward both ends. In one embodiment, in the longitudinal section including the depressions 81 and 82 (the section vertically parallel to the arrangement direction of the resin blocks 56a), the outline of the ends of the resin block 56a is curved. The shape of the outline is not particularly limited and is formed preferably in a quadratic curve such as parabola. The protruded end of the resin block 56a has a curved surface.

The resin blocks 56a have a base material made of resin and a reinforcing material. In one embodiment, carbon fiber is contained as the reinforcing material in the resin blocks 56a. The carbon fiber has thermal conductivity that is generally better than the resin material of the base material. The carbon fiber contained in the resin blocks 56a performs a function of enhancing the thermal conductivity of the resin blocks 56a, as well as a function as the reinforcing material. The heat radiating property of the resin blocks 56a can be improved with an increase in content of the carbon fiber. The content of the carbon fiber can be properly set in consideration of a desired strength or productivity of the resin blocks 56a.

In one aspect, when a sufficient strength can be realized, the reinforcing material may be omitted. In some cases, materials other than the reinforcing material may be contained in the base material. Various resin materials such as thermoplastic resin, thermosetting resin, and the like can be used as the base material. The kind of the reinforcing material is not limited and may properly employ glass fiber, aramid fiber, or the like, in addition to the carbon fiber. For example, a wear preventing agent or frictional-coefficient adjusting agent may be contained in the material other than the reinforcing material.

In one embodiment, the connecting member 57 is formed endless. As shown in FIG. 4, the connecting member 57 extends the arrangement direction of the resin blocks 56a and is impacted into the grooves 59 of the resin blocks 56a. In this way, by impacting the connecting member 57 into the grooves 59 of the resin blocks 56a, a plurality of resin blocks 56a are connected to each other through the connecting member 57. In one embodiment, the connecting member 57 can be formed of rubber. The kind of the rubber constituting the connecting member 57 is not particularly limited and, for example, super heat-proof rubber may be most preferably used. As shown in FIG. 5, a plurality of cores 60 for reinforcement can be buried in the rubber.

The resin blocks 56a and the connecting member 57 are not integrally vulcanized. However, the resin blocks 56a and the connecting member 57 may be integrally vulcanized.

As described hitherto, in the V-shaped belt 31 according to one embodiment, the depressions 81 and 82 exposed to the air are formed in the upper side and the lower side of the resin blocks 56a, respectively. As a result, the heat-radiating area of the resin blocks 56a is enlarged. That is, the area of the resin blocks 56a contacting the air is enlarged. Therefore, the heat-radiating property of the resin blocks 56a is improved.

As schematically shown in FIG. 7, since the depressions 81 and 82 (the depression 82 is not shown in FIG. 7) are formed in the front surface and the rear surface of each resin block 56a, clearances 83 are formed between the neighboring resin blocks 56a. As a result, the air flows in the clearances 83 with the traveling of the V-shaped belt 31 (see the solid arrows in FIG. 7). Specifically, the clearances 83 are formed in the traveling direction of the V-shaped belt 31 (the traveling direction is parallel to the arrangement direction of the resin blocks 56a). The clearances 83 are formed at the front side of the respective resin blocks 56a in the traveling direction. Therefore, since the clearances 83 are formed in the portions in which the air can easily flow, the air actively flows over the surfaces of the resin blocks 56a with the traveling of the V-shaped belt 31, thereby further improving the heat-radiating property of the resin blocks 56a.

When the number of rotation of the sheaves 29 and 30 is increased, the amount of heat emitted from the V-shaped belt 31 is increased. However, according to one embodiment, the traveling speed of the V-shaped belt 31 is increased with increase in the number of rotation of the sheaves 29 and 30, and thus the flow rate of the air passing through the clearances 83 is increased. As a result, the increase in the number of rotation of the sheaves 29 and 30 improves the heat-radiating property of the resin blocks 56a. Therefore, according to one embodiment, it is possible to prevent an increase in temperature of the V-shaped belt 31 even in the case of high-speed driving.

In the V-shaped belt 31 according to one embodiment, the upper end and the lower end in the longitudinal section of the each resin block 56a including the depressions 81 and 82 are tapered. As a result, the clearance 83 is formed in a shape of which the end is widened toward the opening end, thereby easily introducing air. Therefore, it is possible to further improve the heat-radiating property of the V-shaped belt 31.

In the V-shaped belt 31 according to one embodiment, the outline of the end in the longitudinal section of each resin block 56a is in a curved line. As a result, since the air can smoothly flow in the clearances 83 along the curved lines of the resin blocks 56a. That is, the protruded end of each resin block 56a has a curved surface and the protruded is rounded, the air can smoothly flow in the clearance 83. Therefore, it is possible to more efficiently accomplish the heat-radiation.

In one aspect, the depressions 81 and 82 are formed at the lateral center of each resin block 56a. As a result, the center at which heat can most easily stay in each resin block 56a can be efficiently cooled.

In the V-shaped belt 31 according to one embodiment, since the resin blocks 56a have an excellent heat-radiating property, heat difficulty stays in the resin blocks 56a. As a result, it is possible to prevent the excessive increase in temperature of the resin blocks 56a and the connecting member 57. In addition, since the heat-proof characteristic of the V-shaped belt 31 is improved, it is possible enhance the reliability of the V-shaped belt 31.

In the V-shaped belt 31 according to one embodiment, the depressions 81 and 82 are formed at the center side rather than both laterals of each resin block 56a. In other words, the depressions 81 and 82 are formed in the portions other than both laterals and are separated from both lateral surfaces 70 of each resin block 56a. As a result, although the depressions 81 and 82 are provided, the area of the contact portions of the resin blocks 56a with the sheaves 29 and 30 can be sufficiently guaranteed, and thus the strength of the contact portions can be kept well.

In addition, in the V-shaped belt 31 according to one embodiment, the depressions 81 and 82 do not reach the connecting member 57 but are separated from the connecting member 57. In other words, the depressions 81 and 82 are formed in the portions into which the connecting member 57 is not impacted. As a result, although the depressions 81 and 82 are provided, the strength of the engaging portions of the resin blocks 56a with the connecting member 57 cannot be decreased greatly. Therefore, it is possible to maintain the high strength of the resin blocks 56a.

In one aspect, the carbon fiber is contained in the resin blocks 56a of the V-shaped belt 31. As a result, the heat in the resin blocks 56a can be delivered to the surfaces of the resin blocks 56a (specifically, the surfaces of the depressions 81 and 82 with a high cooling effect) through the carbon fiber, thereby further improving the heat-radiating property. In addition, since the carbon fiber functions as the reinforcing material, it is possible to maintain the high strength of the resin blocks 56a in spite of the depressions 81 and 82.

In the V-shaped belt 31 according to one embodiment, it is possible for the strength and the heat-radiating property of the resin blocks 56a to stand together at a high level. Therefore, it is possible to improve the durability of the V-shaped belt 31.

According to one embodiment, since the deterioration of the V-shaped belt 31 due to the heat emission can be suppressed, it is possible to improve the reliability of the CVT 15. In addition, since the V-shaped belt 31 is not deteriorated easily even at the time of high-speed driving, it is possible to enlarge the allowable operation range of the CVT 15. The improvement of the reliability of the CVT 15 also improves the reliability of the motor bicycle 1. The enlargement of the allowable operation range of the CVT 15 can improve the degree of freedom in designing the engine 14.

Next, a V-shaped belt 31 according to other embodiments of the present invention will be described. In the embodiments described below, the V-shaped belt 31 comprises a plurality of resin blocks and a connecting member. Since the connecting member is similar to the first embodiment, description thereof will be omitted. Hereinafter, the resin blocks are described mainly. The same elements as the first embodiment are denoted by the same reference numerals and description thereof will be omitted.

FIGS. 8(a) to 8(c) show a resin block 56b of the V-shaped belt 31 according to a second embodiment. Similarly to the resin block 56a according to the first embodiment, depression 81 is formed in the upper front and rear surfaces of the resin block 56b and depression 82 is formed in the lower front and rear surfaces of the resin block 56b according to the second embodiment. However, the depressions 81 and 82 of the resin block 56b are recessed in a step shape, and thus a step difference is formed in the boundaries of the depressions 81 and 82.

As shown in FIG. 8(a), the longitudinal width of the resin block 56b is decreased from both lateral ends to the center step-like. The longitudinal width of the depression 81 is constant. As shown in FIG. 8(b), the upper depression 81 is vertically recessed toward the center of the resin block 56b. In one aspect, the vertical length of the depression 81 is constant almost all over the lateral direction and the bottom side of the depression 81 is parallel to the upper surface 71 of the resin block 56b. The lower depression 82 is also vertically recessed to the center of the resin block 56b. The vertical length of the depression 82 is constant almost all over the lateral direction.

As shown in FIG. 8(c), the upper portion and the lower portion of the resin block 56b has a width smaller than that of the vertical center.

Therefore, as shown in FIG. 9, in the V-shaped belt 31 according to the second embodiment, the heat-radiating area of the resin blocks 56b is enlarged and clearances 83 are formed between the neighboring resin blocks 56b. As a result, the heat-radiating property of the resin blocks 56b can be improved, and the heat can be prevented from staying in the resin blocks 56b. Therefore, it is possible to suppress the deterioration of the V-shaped belt 31 due to the generation of heat. FIG. 9 is a longitudinal sectional view of the V-shaped belt 31 including the depressions 81 and 82, where the hatching marks indicating a section are omitted. The same is true of all the following figures.

FIGS. 10(a) to 10(c) show a resin block 56c of a V-shaped belt 31 according to a third embodiment. Two depressions 81 laterally arranged are formed in each of the upper front and rear surfaces of the resin block 56c. A depression 82 is formed in each of the lower front and rear surfaces. Similar to the second embodiment, the depressions 81 and 82 are recessed in a step shape in the resin block according to the third embodiment, and thus a step can be formed in each boundary of the depressions 81 and 82.

As shown in FIG. 10(a), the longitudinal width of the resin block 56c is step-like decreased from both laterals to the center and is step-like increased at the center. The longitudinal width in the depression 81 is constant. As shown in FIG. 10(b), the upper depressions 81 are recessed downwardly. In one aspect, the vertical length of the depressions 81 is constant almost all over the lateral direction, and the bottom side of the depressions 81 is parallel to the top surface 71 of the resin block 56c. As shown in FIG. 10(c), the upper end and the lower end of the resin block 56c have a width smaller than the vertical center.

Therefore, in the V-shaped belt 31 according to the third embodiment, the heat-radiating area of the resin blocks 56c can be enlarged and clearances can be formed between the neighboring resin blocks 56c. As a result, the heat-radiating property of the resin blocks 56c is improved, and thus the deterioration of the V-shaped belt 31 due to the generation of heat can be suppressed.

FIGS. 11(a) to 11(c) show a resin block 56d of the V-shaped belt 31 according to a fourth embodiment. In the resin block 56d according to the fourth embodiment, a depression 81 is formed in the upper front and rear surfaces and a depression 82 is formed in the lower front and rear surfaces. A depression 84 connecting the upper depression 81 to the lower depression 82 is formed at the center of the resin block 56d. A circumferential portion 85 extending approximately vertically is formed at both sides of the depression 84. In the resin block 56d according to the fourth embodiment 4, since the depressions 81, 82, and 84 are vertically connected to each other, an approximately I-shaped depression vertically extending in the resin block 56d as a whole is formed. Other construction is similar to the resin block 56d according to the second embodiment.

Therefore, in the V-shaped belt 31 according to the fourth embodiment, the heat-radiating property of the resin blocks 56d can be improved to thereby suppress the deterioration due to the generation of heat. In addition, in the fourth embodiment, since the depression 84 is formed at the vertical center of each resin block 56d, it is possible to efficiently cool the center of the resin blocks 56d. Heat can most easily stay at the center of the resin blocks 56d. Therefore, according to the fourth embodiment, since the portion in which the heat easily stays can be directly cooled, it is possible to further improve the heat-radiating property of the resin blocks 56d. Therefore, it is possible to further suppress the deterioration of the V-shaped belt 31 due to the generation of heat.

FIGS. 12(a) to 12(c) show a resin block 56e of the V-shaped belt 31 according to a fifth embodiment. The resin block 56e is obtained by removing the circumferential portion 85 of the center depression 84 from the resin block 56d according to the fourth embodiment. Therefore, in the fifth embodiment, since the center portion in which the heat can easily stay can be directly cooled, thereby improving the heat-radiating property of the resin block 56d.

In the second to fifth embodiments described hitherto, the longitudinal widths in the upper end and the lower end of the resin blocks 56b to 56d are constant. However, the shapes of the ends of the resin blocks 56b to 56d are not limited. For example, the ends of the resin blocks 56b to 56d may be formed tapered. Next, embodiments in which the end shapes of the resin blocks 56b to 56d are modified will be described.

FIG. 13 shows a V-shaped belt 31 according to a sixth embodiment. In the sixth embodiment, the upper and lower ends of the resin blocks 56e have the front and rear edges obliquely cut out. That is, the ends are in a chamfered shape. As a result, in the sixth embodiment, the clearances 83 formed between the neighboring resin blocks 56e is widened toward the opening end (in other words, the exit and entrance side of the air).

In the V-shaped belt 31 according to the sixth embodiment, since the opening end of the clearances 83 is widened, the air can easily enter the clearances 83. As a result, it is possible to further improve the heat-radiating property of the resin blocks 56e.

FIG. 14 shows a V-shaped belt 31 according to a seventh embodiment. In the seventh embodiment, the upper and lower ends of the resin blocks 56f have the front and rear edges obliquely cut out. However, in the seventh embodiment, the edges are in a shape longitudinally cut out from the longitudinal center position thereof. Therefore, the ends of the resin blocks 56f have a pointed shape with an acute angle.

According to the seventh embodiment, since the opening end of the clearances 83 is widened, the air can easily enter the clearances 83. As a result, it is possible to improve the heat-radiating property of the resin blocks 56f.

FIG. 15 shows a V-shaped belt 31 according to an eighth embodiment. In the eighth embodiment, the upper and lower ends of the resin blocks 56g have a sectional shape of a circular arc. As a result, the width of the clearances 83 varies continuously and slowly. Accordingly, since the area of a flow path in the clearances 83 is not rapidly changed, the air can be smoothly introduced into the clearances 83. Therefore, it is possible to improve the heat-radiating property of the resin blocks 56g.

In the sixth to eighth embodiments, only the ends of the resin blocks 56e to 56f have a partially narrowed tip. However, the entire portions of the resin blocks from the vertical center to the ends may be formed to have a narrowed tip. Next, embodiments in which the entire portion from the center to the ends of the resin block is formed to have a slowly narrowed tip will be described.

FIG. 16 shows a V-shaped belt 31 according to a ninth embodiment. In the ninth embodiment, the upper and lower ends of a resin block 56h are formed in a shape that the entire portions from the center to the ends are obliquely cut out. As a result, the width of the clearances 83 is slowly widened from the center to the ends. Therefore, since the air can easily flow in the clearances 83, it is possible to improve the heat-radiating property of the resin blocks 56h.

FIG. 17 shows a V-shaped belt 31 according to a tenth embodiment. A resin block 56i according to the tenth embodiment has a shape that the ends of the resin block 56h according to the ninth embodiment are further chamfered. In other words, the resin block 56i has a shape that the ends are narrowed in two steps from the center to the ends. According to the tenth embodiment, since the entrance of the clearances 83 is further widened, the air can more easily flow in the clearances 83. Therefore, it is possible to improve the heat-radiating property of the resin blocks 56i.

FIG. 18 shows a V-shaped belt 31 according to an eleventh embodiment. A resin block 56j according to the eleventh embodiment has a shape that the ends are narrowed in two steps from the center to the ends. However, in the eleventh embodiment, the ends are formed in a pointed shape with an acute angle. According to the eleventh embodiment, since the entrance of the clearances 83 is widened, the air can more easily flow in the clearances 83. Therefore, it is possible to improve the heat-radiating property of the resin blocks 56j.

FIG. 19 shows a V-shaped belt 31 according to a twelfth embodiment. A resin block 56k according to the twelfth embodiment has a shape that the edges are cut out from the center to the ends into a tapered shape with an acute angle. According to the twelfth embodiment, since the entrance of the clearances 83 is further widened, the air can more easily flow in the clearances 83. Therefore, it is possible to improve the heat-radiating property of the resin blocks 56k.

FIG. 20 shows a V-shaped belt 31 according to a thirteenth embodiment. In the thirteenth embodiment, the sectional shape of the resin blocks according to the second to fifth embodiments is changed to the same shape as the first embodiment. That is, in the thirteenth embodiment, the longitudinal width of a resin block 56l is smoothly decreased from the center to the ends. The outline of the ends of the resin block 56l forms a convex curve toward the tip. According to the thirteenth embodiment, as described in the first embodiment, the air can smoothly flow in the clearances 83 along the curved shape of the resin block 56l. As a result, since the air can easily flow in the clearances 83, it is possible to improve the heat-radiating property of the resin blocks 56l.

As described above, by continuously or step-like reducing the width of the resin block from the center to the ends in the longitudinal section of the resin block, the clearances can be formed between the neighboring resin blocks so as to be widened from the center to the ends of the resin blocks. As a result, since the air can easily flow in the clearances, it is possible to effectively improve the heat-radiating property of the resin blocks.

The V-shaped belt according to the present invention is not limited to the above-mentioned embodiments but may be embodied in various forms. In the embodiments, the depressions 81 and 82 are formed in all the resin blocks. However, the depressions 81 and 82 may be formed in only a part of the resin blocks. That is, in a part of the V-shaped belt, a plurality of resin blocks in which the depressions 81 and 82 are formed may be connected through the connecting member. Therefore, the V-shaped belts obtained by combining the resin blocks having the depressions 81 and 82 and the resin blocks having no depression belong to the scope of the present invention. By preparing plural kinds of resin blocks in which depressions having different shapes and sizes are formed and combining these resin blocks of different kinds, it is also possible to constitute a V-shaped belt 31.

For example, as shown in FIG. 21, first resin blocks 56m having the depressions and resin blocks 56n having no depression may be alternately arranged in the length direction of the connecting member 57. Such a V-shaped belt 31 can improve the heat-radiating property. In a V-shaped belt in which a plurality of resin blocks are generally connected to each other, when the connecting member is loosened, high-frequency vibration may occur in the V-shaped belt. However, in the V-shaped belt described above, since the resin blocks 56m having the depressions and the resin blocks 56n having no depression are mixed, the resonant frequency can be dispersed. Therefore, it is possible to suppress the vibration and noises of the V-shaped belt 31. In addition, even when plural kinds of resin blocks having the depressions are formed at different positions or plural kinds of resin blocks having the depressions formed in different shapes or sizes are combined, it is possible to reduce the vibration and noises, similarly to the V-shaped belt 31 shown in FIG. 21.

As described above, various embodiments of the present invention are applicable to a V-shaped belt, a belt-type transmission having the V-shaped belt, and a saddle-type vehicle.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A V-shaped belt comprising:
a plurality of resin blocks each having first and second longitudinal surfaces, and first and second lateral surfaces arranged to engage inner surfaces of a sheave, the plurality of resin blocks arranged side-by-side in a longitudinal direction of the plurality of resin blocks; and
an endless connecting member extending in the longitudinal direction of the plurality of resin blocks and impacted into the plurality of resin blocks to connect the plurality of resin blocks to each other; wherein
each of the plurality of resin blocks include:
 a depression provided at a center of each of the first and second longitudinal surfaces and spaced inwardly from the first and second lateral surfaces, the depressions are exposed to air; and
 the depressions are recessed inwardly from the first and second longitudinal surfaces such that the depressions are recessed inwardly to a lesser degree at outer edges thereof closer to the first and second lateral surfaces and are recessed inwardly to a greater degree at a location closer to the center of the first and second longitudinal surfaces.

2. A V-shaped belt comprising:
a plurality of resin blocks each having first and second longitudinal surfaces, and first and second lateral surfaces arranged to engage inner surfaces of a sheave, the plurality of resin blocks arranged side-by-side in a longitudinal direction of the plurality of resin blocks; and
an endless connecting member extending in the longitudinal direction of the plurality of resin blocks and impacted into the plurality of resin blocks to connect the plurality of resin blocks to each other; wherein
each of the resin blocks include:
 a solid center portion having no depressions formed therein and having a longitudinal width that is equal to a maximum longitudinal width of the respective resin block; and
 first and second depressions are provided in each of the first and second longitudinal surfaces and spaced inward from the first and second lateral surfaces, the first and second depressions extending from a top of each of the plurality of resin blocks and separated from each other along the first and second longitudinal surfaces by the solid center portion, and the depressions are exposed to air.

3. A V-shaped belt comprising:
a plurality of resin blocks each having first and second longitudinal surfaces, and first and second lateral surfaces arranged to engage inner surfaces of a sheave, the plurality of resin blocks arranged side-by-side in a longitudinal direction of the plurality of resin blocks; and
an endless connecting member extending in the longitudinal direction of the plurality of resin blocks and impacted into the plurality of resin blocks to connect the plurality of resin blocks to each other; wherein
a first depression is provided at a center of the first and second longitudinal surfaces and spaced inwardly from the first and second lateral surfaces in a first plurality of the resin blocks in the V-shaped belt, the first depressions extending from tops of the first plurality of the resin blocks;
at least a second depression is provided at a center of the first and second longitudinal surfaces and spaced inwardly from the first and second lateral surfaces in a second plurality of the resin blocks in the V-shaped belt, the second depressions extending from tops of the second plurality of the resin blocks; and
the first depressions have a different shape or size than the second depressions.

4. A V-shaped belt comprising:
a plurality of resin blocks each having first and second longitudinal surfaces, and first and second lateral surfaces arranged to engage inner surfaces of a sheave, the plurality of resin blocks arranged side-by-side in a longitudinal direction of the plurality of resin blocks; and
an endless connecting member extending in the longitudinal direction of the plurality of resin blocks and impacted into the plurality of resin blocks to connect the plurality of resin blocks to each other; wherein
a depression is provided at a center of the first and second longitudinal surfaces and spaced inwardly from the first and second lateral surfaces in a first plurality of the resin blocks in the V-shaped belt, the first depressions extending from tops of the first plurality of the resin blocks; and
no depression is provided at a center of the first and second longitudinal surfaces in a second plurality of the resin blocks in the V-shaped belt.

5. The V-shaped belt according to any one of claims 1 to 4, wherein the plurality of resin blocks include carbon fibers arranged adjacent to or at a surface of the depressions so as to conduct heat from the plurality of resin blocks directly to the surface of the depressions.

6. The V-shaped belt according to any one of claims 1, 3, and 4, wherein the depressions extend from tops of the plurality of resin blocks vertically downwards into the plurality of resin blocks.

7. The V-shaped belt according to claim 6, further comprising a depression extending from bottoms of the plurality of resin blocks vertically upwards into the plurality of resin blocks.

8. The V-shaped belt according to claim 6, wherein the depressions are recessed downwardly a maximum amount at the center of the first and second longitudinal surfaces.

9. The V-shaped belt according to claim 7, wherein the depressions are recessed upwardly a maximum amount at the center of the first and second longitudinal surfaces.

10. The V-shaped belt according to any one of claims 1, 3, and 4, wherein the depressions are recessed continuously downward from ends of the depressions to a center of the depressions at the center of the first and second longitudinal surfaces.

11. The V-shaped belt according to any one of claims 1, 3, and 4, wherein a cross-sectional shape of tops of the plurality of resin blocks along the center of the first and second longitudinal surfaces is curved such that air can smoothly flow from the depression in the first longitudinal surface over the tops of the plurality of resin blocks to the depression in the second longitudinal surface.

12. A belt-type transmission comprising:
   a primary sheave in which the width of a belt groove is variable;
   a secondary sheave in which the width of a belt groove is variable; and
   the V-shaped belt according to any one of claims 1 to 4 wound around the primary sheave and the secondary sheave.

13. A saddle-type vehicle having the belt-type transmission according to claim 12.

* * * * *